US009964169B2

(12) United States Patent
Takeshita et al.

(10) Patent No.: US 9,964,169 B2
(45) Date of Patent: May 8, 2018

(54) DAMPER HAVING TORQUE LIMITER FUNCTION

(71) Applicant: AISIN AW INDUSTRIES CO., LTD., Echizen-shi, Fukui-ken (JP)

(72) Inventors: Yoshito Takeshita, Echizen (JP); Fumiaki Doseki, Echizen (JP); Masahiro Yamaguchi, Echizen (JP)

(73) Assignee: AISIN AW INDUSTRIES CO., LTD., Fukui (JP)

( * ) Notice: Subject to any disclaimer, the term of this patent is extended or adjusted under 35 U.S.C. 154(b) by 456 days.

(21) Appl. No.: 14/487,843

(22) Filed: Sep. 16, 2014

(65) Prior Publication Data
US 2015/0005079 A1    Jan. 1, 2015

Related U.S. Application Data

(62) Division of application No. 13/778,929, filed on Feb. 27, 2013, now Pat. No. 8,858,344, which is a division
(Continued)

(30) Foreign Application Priority Data

Oct. 30, 2008  (JP) ................. 2008-279057
Jun. 30, 2009  (JP) ................. 2009-155582

(51) Int. Cl.
*F16F 15/10*  (2006.01)
*F16F 7/02*  (2006.01)
(Continued)

(52) U.S. Cl.
CPC ............... *F16F 7/02* (2013.01); *F16F 15/10* (2013.01); *F16F 15/1297* (2013.01); *F16F 15/163* (2013.01)

(58) Field of Classification Search
CPC .......... F16F 7/02; F16F 15/10; F16F 15/1297; F16F 15/163
(Continued)

(56) References Cited

U.S. PATENT DOCUMENTS 4,723,463 A    2/1988  Reik et al.
4,727,767 A    3/1988  Aiki et al.
(Continued)

FOREIGN PATENT DOCUMENTS

DE    102005009187 A1    9/2006
DE    102008042636 A1    4/2010
(Continued)

OTHER PUBLICATIONS

Mechanical Engineering Design, 7th ed. New York, McGraw-Hill, 2004, p. 464. TJ230.S5 2004.
(Continued)

*Primary Examiner* — Matthieu F Setliff
(74) *Attorney, Agent, or Firm* — Caesar Rivise, PC

(57) ABSTRACT

A damper includes an outer cover having a front cover and a rear cover. The covers are joined to form a lubricant oil accommodation chamber for accommodating liquid. A damper device, a limiter mechanism, a first plate including a first collar portion located toward the front of the limiter mechanism, and a second plate including a second collar portion located toward the rear of the limiter mechanism are arranged in the outer cover. The limiter mechanism includes a first limiter plate, which is an input side on the torque transmission path, a second limiter plate, which is an output side on the torque transmission path, and a limiter disc spring, which presses the limiter plates.

8 Claims, 12 Drawing Sheets

Related U.S. Application Data of application No. 12/676,070, filed as application No. PCT/JP2009/068942 on Oct. 29, 2009, now Pat. No. 8,398,492.

(51) Int. Cl.
*F16F 15/129* (2006.01)
*F16F 15/16* (2006.01)

(58) Field of Classification Search
USPC .................. 464/46, 68.3, 68.4, 68.41, 68.8; 192/3.29, 213.2–213.22
See application file for complete search history.

(56) References Cited

U.S. PATENT DOCUMENTS

| | | |
|---|---|---|
| 4,729,465 A | 3/1988 | Reik |
| 4,732,250 A | 3/1988 | Maucher et al. |
| 4,739,866 A | 4/1988 | Reik et al. |
| 4,777,843 A | 10/1988 | Bopp |
| 4,783,895 A | 11/1988 | Reik |
| 4,788,884 A | 12/1988 | Reik et al. |
| 4,874,350 A | 10/1989 | Casse et al. |
| 4,901,596 A | 2/1990 | Reik et al. |
| 4,904,226 A | 2/1990 | Chasseguet et al. |
| 4,908,003 A | 3/1990 | Kobayashi et al. |
| 4,928,486 A | 5/1990 | Despres |
| 4,944,712 A | 7/1990 | Worner et al. |
| 4,946,420 A | 8/1990 | Jackel |
| 4,972,734 A | 11/1990 | Hyodo et al. |
| 5,030,167 A | 7/1991 | Jackel |
| 5,040,433 A | 8/1991 | Reik et al. |
| 5,194,044 A | 3/1993 | Jackel et al. |
| 5,242,328 A | 9/1993 | Friedmann et al. |
| 5,273,372 A | 12/1993 | Friedmann et al. |
| 5,349,883 A | 9/1994 | Reik et al. |
| 5,374,218 A | 12/1994 | Reik et al. |
| 5,382,193 A | 1/1995 | Friedmann et al. |
| 5,487,704 A | 1/1996 | Friedmann et al. |
| 5,759,106 A | 6/1998 | Reik et al. |
| 5,772,516 A | 6/1998 | Bonfilio |
| 5,842,922 A | 12/1998 | Reik et al. |
| 5,860,863 A | 1/1999 | Friedmann et al. |
| 5,863,252 A | 1/1999 | Friedmann et al. |
| 5,873,785 A | 2/1999 | Friedmann et al. |
| 5,971,857 A | 10/1999 | Friedmann et al. |
| 5,980,386 A | 11/1999 | Friedmann et al. |
| 5,980,387 A | 11/1999 | Friedmann et al. |
| 5,984,789 A | 11/1999 | Reik et al. |
| 6,119,839 A | 9/2000 | Jackel et al. |
| 6,120,380 A | 9/2000 | Reik et al. |
| 6,179,714 B1 | 1/2001 | Friedmann et al. |
| 6,196,923 B1 | 3/2001 | Friedmann et al. |
| 6,196,925 B1 | 3/2001 | Friedmann et al. |
| 6,224,488 B1 | 5/2001 | Friedmann et al. |
| 6,283,864 B1 | 9/2001 | Reik et al. |
| 6,558,260 B1 | 5/2003 | Jackel et al. |
| 2001/0018367 A1 | 8/2001 | Friedmann et al. |
| 2001/0019968 A1 | 9/2001 | Friedmann et al. |
| 2001/0044340 A1 | 11/2001 | Jackel et al. |
| 2003/0100376 A1 | 5/2003 | Friedmann et al. |
| 2006/0196751 A1 | 9/2006 | Schneider et al. |
| 2008/0078646 A1 | 4/2008 | Ebata |
| 2008/0105512 A1 | 5/2008 | Saeki et al. |
| 2008/0128235 A1 | 6/2008 | Avins et al. |
| 2010/0101912 A1 | 4/2010 | Agner |
| 2011/0120832 A1 | 5/2011 | Takeshita et al. |

FOREIGN PATENT DOCUMENTS

| | | | |
|---|---|---|---|
| JP | 56-134421 U | | 10/1981 |
| JP | S61-23543 | | 2/1986 |
| JP | 63084806 U | * | 6/1988 |
| JP | H026839 U | * | 1/1990 |
| JP | 05-240307 | | 9/1993 |
| JP | 07-071529 | | 3/1995 |
| JP | 07-071530 | | 3/1995 |
| JP | 07-151186 | | 6/1995 |
| JP | 07-151187 | | 6/1995 |
| JP | 08-004838 | | 1/1996 |
| JP | 2002-13547 A | | 1/2002 |
| JP | 2008-274968 | | 11/2008 |
| JP | 2008-304008 A | | 12/2008 |
| WO | 2008049388 A2 | | 5/2008 |
| WO | 2009003438 A1 | | 1/2009 |

OTHER PUBLICATIONS

International Search Report dated Feb. 26, 2010 for PCT/JP2009/068942.
Written Opinion for PCT/JP2009/068942.
Office Action for German Patent Application No. 11 2009 001 841.6 dated Aug. 17, 2012.

\* cited by examiner

→ Front

DAMPER HAVING TORQUE LIMITER FUNCTION

CROSS REFERENCE TO RELATED APPLICATIONS

This divisional application claims the benefit under 35 U.S.C. § 121 of application Ser. No. 13/778,929, filed on Feb. 27, 2013, now U.S. Pat. No. 8,858,344, which in turn claims the benefit under 35 U.S.C. § 121 of application Ser. No. 12/676,070, filed on Mar. 2, 2010, now U.S. Pat. No. 8,398,492, which in turn claims the benefit under 35 U.S.C. § 371 of PCT/JP2009/068942, filed on Oct. 29, 2009, the contents all of which are incorporated herein by reference.

TECHNICAL FIELD

The present invention relates to a wet-type damper capable of absorbing torque vibration generated at a power source such as an engine and having a torque limiter function.

BACKGROUND ART

In a vehicle, a damper is usually arranged in a torque transmission path to absorb torque vibration, which is generated at a power source such as an engine or an electric motor. When a large torque is generated at the power source, such a damper blocks the transmission of torque from one side of the torque transmission path to the other side of the torque transmission path with a limiter mechanism (see Japanese Laid-Open Patent Publication No. 2008-274968).

Japanese Laid-Open Patent Publication No. 2008-274968 describes a damper (hereinafter referred to as "conventional damper"), which is of a wet-type damper used in a so-called hybrid vehicle, which uses an engine and an electric motor as a power source. As shown in FIG. 13, the conventional damper includes an outer case 303, which is formed by a front cover 301 serving as a first cover and a rear cover 302 serving as a second cover. The front cover 301, which is generally cylindrical and has a closed bottom, is connected to an output shaft of the engine. The rear cover 302, which is generally annular when viewed from the front, is welded and fixed to the circumference of the front cover 301. The outer case 303 is filled with lubricant oil serving as a liquid. A sleeve 304 projects rearward from a radially inner portion of the rear cover 302. A planetary gear mechanism (not shown) has an input shaft (output member) 305, the front end of which is inserted into the outer case 303.

The outer case 303 houses a generally cylindrical hub 306, a damper device 307, and a limiter mechanism 308. The hub 306 is supported to be integrally rotatable with the input shaft 305 of the planetary gear mechanism. The damper device 307 is arranged radially outward from the hub 306. The limiter mechanism 308 is arranged radially outward from the damper device 307. The damper device 307 includes an annular central plate 309, to which the torque from the power source is transmitted through the limiter mechanism 308, and an annular intermediate member 310, which is supported to be integrally rotatable with by the hub 306. A torque absorber 312 is arranged in the torque transmission path between the central plate 309 and the intermediate member 310. The torque absorber 312 has a damper spring 311 serving as an elastic member that is elastic in the circumferential direction.

The limiter mechanism 308 includes an annular disc spring (limiter biasing member) 313 and a limiter plate 314. The disc spring 313 is supported by a radially outer portion of the rear cover 302. The limiter plate 314 is arranged between the disc spring 313 and a radially outer portion of the central plate 309. The disc spring 313 applies biasing force to the limiter plate 314, which further applies to biasing force to the central plate 309. At the radially outer portion of the central plate 309, friction members 315 and 316 are respectively arranged on the surface of the central plate 309 facing toward the limiter plate 314, and a front surface of the central plate 309 fixing toward the radially outer portion of the bottom of the front cover 301. The limiter plate 314 pushes the central plate 309 via the friction member 315 with the biasing force of the disc spring 313. The central plate 309 further pushes the bottom of the front cover 301 via the friction member 316. Thus, when the outer case 303 rotates, frictional force is generated between the friction member 315 and the limiter plate 314 and between the friction member 316 and the front cover 301. This rotates the central plate 309 with the outer case 303.

If the torque from the power source does not reach a predetermined torque, the torque from the power source is transmitted via the outer case 303, the limiter mechanism 308, the damper device 307, and the hub 306 to the input shaft 305 of the planetary gear mechanism. If an excessively large torque is generated and the torque exceeds a predetermined torque when the vehicle is driven by the engine or when starting the engine with the electric motor, slipping occurs between the limiter mechanism 308 and the central plate 309 of the damper device 307. In other words, if torque that is greater than the frictional force generated between the limiter mechanism 308 and the damper device 307 is input to the conventional damper, the transmission of an excessively large torque between the limiter mechanism 308 and the damper device 307 is blocked.

When assembling the outer case 303 in the conventional damper, the front cover 301 is welded to the rear cover 302 in a state in which the damper device 307 and the limiter mechanism 308 are accommodated in the rear cover 302. In this state, the frontward biasing force of the disc spring 313 in the limiter mechanism 308 is applied via the limiter plate 314 and the central plate 309 to the front cover 301. Thus, the radially outer portion of the front cover 301 must be welded with the radially outer portion of the rear cover 302 while pressing the front cover 301 against the rear cover 302 to maintain the predetermined positional relationship of the covers 301 and 302 in the axial direction. Since pressing force must be applied to the front cover 301 or the rear cover 302 when coupling the covers 301 and 302, the assembling of the outer case 303 is extremely difficult.

Furthermore, the front cover 301 may be deformed when pressed against the rear cover 302 when assembling the outer case 303.

Moreover, the friction members 315 and 316 have friction coefficients (μ) that generally vary greatly. Thus, the limiter mechanism 308 may not function even if the predetermined torque cannot be reached. In particular, with a dry-type friction member, the friction coefficient (μ) increases when its engagement surface becomes rusted. This may overly increase the torque (critical torque) at which torque transmission is blocked. As a result, excessive torque may inflict damages to the damper and other mechanisms in the torque transmission path.

Accordingly, in the prior art, each mechanism arranged in a torque transmission path must be designed taking into consideration the variations in critical torque. This inevitably enlarges each mechanism. For example, the outer diameter of the input shaft 305 in the planetary gear mechanism must be increased, and the dimensions of the damper spring 311 must be increased.

Additionally, an impact torque is alleviated and absorbed as the damper spring 311 compresses and deforms. Thus, the damper spring 311 has a relatively low spring constant so as to be suitable for alleviating such impact torque. In contrast, however, a large impact torque may not be sufficiently alleviated if the spring constant is lowered. Further, the energy of the impact torque cannot be readily absorbed just with the damper spring 311.

It is an object of the present invention to provide a damper that allows for an outer case to be easily assembled without being deformed. It is another object of the present invention to provide a damper that suppresses variations in the friction coefficient of a friction member to stabilize the critical torque, while smoothly alleviating a large impact torque.

DISCLOSURE OF THE INVENTION

To achieve the above objects, one aspect of the present invention provides a damper arranged in a torque transmission path that transmits torque from a power source to an output member rotated about a predetermined axis. The damper includes a housing, a damper device, a limiter mechanism, and a separation restriction member. The housing is rotated about the axis and includes a first cover and a second cover arranged along the axis. The first and second covers are joined to form a liquid accommodation chamber which accommodates a liquid. The damper device is arranged in the liquid accommodation chamber and capable of absorbing torque fluctuation transmitted through the housing. The limiter mechanism is arranged in the liquid accommodation chamber and includes an input side portion located at an input side of the torque transmission path, an output side portion arranged opposing the input side portion and located at an output side of the torque transmission path, and a limiter biasing member which applies a biasing force to at least one of the input side portion and the output side portion in a direction that the input side portion and the output side portion approach each other. The separation restriction member is arranged in the liquid accommodation chamber. The separation restriction member restricts relative movement of the first cover and the second cover caused by the biasing force from the limiter biasing member in a direction that separates the first cover and second cover from each other.

In the above structure, the separation restriction member suppresses relative movement of the covers such that they move away from each other due to the biasing force of the limiter biasing member in the limiter mechanism. More specifically, when the two covers are joined in a state in which the damper device and the limiter mechanism are accommodated in the liquid accommodation chamber, the separation restriction member suppresses relative movement of the covers in a direction in which they are separated from each other which is along an axial direction. Since changes in the positional relationship of the two covers in the axial direction are suppressed, there is no need to apply force for pressing one of the two covers against the other one when joining the two covers. Therefore, in comparison with when joining the two covers while applying a pressing force to one of the two covers, the probability of an outer case being deformed when joining the two covers is reduced. Further, since pressing force does not have to be applied to at least one of the two covers, the assembling of the damper is facilitated.

Preferably, the separation restriction member includes a first restriction portion arranged on one side of the limiter mechanism in the axial direction and a second restriction portion arranged on the other side of the limiter mechanism in the axial direction. Further, the first and second restriction portions are arranged so as to maintain the distance therebetween.

The above structure maintains the distance between the first restriction member and the second restriction member, which are arranged along the axial direction, even if the biasing force of the limiter biasing member in the limiter mechanism arranged between the first and second restriction members is applied to the first and second restriction members. Accordingly, relative movement of the covers such that they move away from each other due to the biasing force of the limiter biasing member is suppressed. That is, pressing force does not have to be applied to at least one of the two covers when joining the two covers since changes in the positional relationship of the two covers in the axial direction are suppressed.

Preferably, the separation restriction member is supported by a downstream side member, which is located downstream from the limiter mechanism in the torque transmission path, so as to be integrally rotatable with the downstream side member in a state in which movement of each of the first and second restriction portions in the axial direction is suppressed.

In the above structure, the separation restriction member is supported by the downstream side member in a state in which movement of each restriction portion in the axial direction is suppressed. This suppresses the application of biasing force to the two covers in a direction in which the covers are separated from each other.

Preferably, the limiter mechanism is arranged inward from the damper device in a radial direction of the damper that is orthogonal to the axis.

With the above structure, in comparison to when the limiter mechanism is arranged outward from the damper device in the radial direction of the damper, the damper may entirely be more miniaturized in the radial direction.

Preferably, the damper further includes a coupling member coupled to the output member in the housing in a manner integrally rotatable with the output member. The coupling member supports the separation restriction member in an integrally rotatable state.

In the above structure, the separation restriction member is supported by the coupling member. Thus, force for separating the two covers from each other, which is based on biasing force of the limiter biasing member, is not applied to the two covers.

Preferably, the damper further includes a hysteresis mechanism arranged in the liquid accommodation chamber. The hysteresis mechanism is configured to function when a rotation difference of the housing and the output member in a rotation direction about the axis becomes equal to a predetermined rotation difference. The hysteresis mechanism is arranged inward from the damper device and the limiter mechanism in a radial direction of the damper that is orthogonal to the axis.

With the above structure, in comparison to when the hysteresis mechanism is arranged outward from the damper device and the limiter mechanism in the radial direction of the damper, the damper may entirely be more miniaturized in the radial direction.

Preferably, the damper further includes a cylindrical coupling member and an annular supporting member. The coupling member coupled to the output member in the housing in a manner integrally rotatable with the output member. The supporting member is arranged on a circumferential side of the coupling member and supported by the coupling member in a state integrally rotatable with the coupling member. The coupling member includes a flange arranged at a position separated from the supporting member in the axial direction along the axis and arranged to form an installation space between the flange and the supporting member in the axial direction. The hysteresis mechanism includes a friction generation unit, which is arranged in the installation space, and a rotation unit, which is rotated with the housing by torque transmitted from the housing when a rotation difference between the housing and the output member becomes equal to a predetermined rotation difference. The friction generation unit is configured to generate frictional force with the rotation unit that suppresses rotation of the rotation unit when the rotation unit rotates with the housing.

In the above structure, when the rotation difference of the housing and the output member becomes equal to a predetermined rotation difference, frictional force suppressing rotation of the rotation unit and the housing is generated between the friction generation unit and the rotation unit. Thus, torque fluctuation transmitted to the housing becomes such that the rotation difference of the housing and the output member exceeds the predetermined rotation difference, the hysteresis mechanism decreases the torque fluctuation.

Preferably, the rotation unit includes a contacted portion arranged in the installation space. The friction generation unit includes a contact member, which is movable in the axial direction and contacts the contacted portion of the rotation unit, and a hysteresis biasing member, which applies a biasing force to the contact member so that the contact member presses the contacted portion.

The above structure prevents the biasing force of the hysteresis biasing member of the friction generation unit from acting on the housing. That is, the biasing force from the hysteresis biasing member that biases the two covers away from each other along the axial direction is prevented from acting on at least one of the two covers. This suppresses deformation of the outer case during assembling and facilitates the assembling of the outer case.

Preferably, the damper device includes a first torque transmission unit, a second torque transmission unit, and an elastic member. The first torque transmission unit is arranged in the housing in a torque transmittable state. The second torque transmission unit is arranged at the same position as the first torque transmission unit in the radial direction of the damper and configured to be torque transmittable to the output member. The elastic member is elastic in a circumferential direction of which center is the axis and arranged in a torque transmittable state between the first torque transmission unit and the second torque transmission unit in the circumferential direction.

In the above structure, the elasticity of the elastic member absorbs torque fluctuations transmitted from the power source.

Preferably, the first torque transmission unit is arranged in the housing in a state integrally rotatable with the housing, and the input side portion of the limiter mechanism is connected to the second torque transmission unit in a torque transmittable state.

Generally, a damper device includes an annular drive side member, which is discrete from the housing, and the drive side member is fixed to the housing in an integrally rotatable state. Further, a first torque transmission unit is formed by the drive side member. However, in the present invention, the drive side member is eliminated, and the first torque transmission unit is arranged in the housing. The elimination of the drive side member allows for miniaturization of the damper in the axial direction.

Preferably, the covers are joined by welding a first fixing portion of the first cover to a second fixing portion of the second cover, which faces toward the first fixing portion.

In the above structure, the two covers may be joined by welding a radially outer portion of the second cover to a radially outer portion of the first cover even if a force for pressing the covers toward each other is not applied to at least one of the two covers. This suppresses deformation of the outer case and facilitates the assembling of the outer case.

A further aspect of the present invention provides a damper incorporated in a power transmission mechanism for a hybrid vehicle. The damper includes a housing and a damper device. The housing includes a first cover and a second cover joined with each other. The housing is coupled to a drive plate and filled with lubricant oil. The damper device is arranged in the housing. The damper device includes a plurality of damper springs, a central disc, which is a torque input side portion, a first friction member arranged in a peripheral portion of the central disc, a limiter plate arranged to face toward the first friction member, a first biasing member, a hub, a first plate and a second plate, which are torque output side portions, a second friction member, and a second biasing member. The first biasing member pushes the limiter plate so that the central disc is arranged between the limiter plate and the housing. The hub has a shaft hole arranged at a center of the damper device and fitted to an output member. The first plate and second plate are arranged on opposite sides of the central disc. The second friction member is arranged between the torque output side portion and the central disc. The second biasing member biases the second friction member. The second friction member suppresses relative rotation of the central disc and the torque output side portion that is greater than or equal to a certain level with slip friction generated when the damper springs are deformed.

Preferably, peripheral portions of the first plate and the second plate are spaced from the central disc so as not to contact the central disc, and inner portions of the first plate and second plate are contactable in a slipping manner with the central disc.

Preferably, the second friction member engages an engagement groove formed in the central disc so as to be rotatable relative to the central disc in a predetermined rotation angle range, and the second friction member generates a slip friction when a relative rotation angle between the central disc and the torque output side portion becomes greater than or equal to a certain angle.

Preferably, the central disc is generally ring-shaped and includes an inner portion in which spring holders are arranged, in which two damper springs are arranged in series between adjacent ones of the spring holders. The hub includes a flange supporting an intermediate member having an engagement groove. A separator projecting from an outer circumference of the intermediate member is arranged between the two damper springs. The second friction member engages the engagement groove of the intermediate member so as to be rotatable relative to the intermediate member in a predetermined rotation angle range. The second friction member generates slip friction when a relative rotation angle between the central disc and the torque output side portion becomes greater than or equal to a certain angle.

Preferably, the hub includes a flange having first to third disc portions that are concentric and have different outer diameters. The second biasing member is attached to the first disc portion having the smallest diameter. A washer and the second friction member are attached to the second disc portion having an intermediate outer diameter. The washer and the second friction member are arranged between the first plate and the third disc portion having the largest diameter in a state in which a biasing force of the second biasing member is applied. An engagement piece is arranged in the washer engages with an engagement hole of the first plate.

Another aspect of the present invention provides a damper incorporated in a power transmission mechanism for a hybrid vehicle. The damper includes a housing and a damper device. The housing includes a first cover and a second cover joined with each other. The housing is coupled to a drive plate and filled with lubricant oil. The damper device is arranged in the housing. The damper device includes a central disc, a first friction member arranged at a peripheral portion of the central disc, a limiter plate arranged to face toward the first friction member, a first biasing member, a hub, a first plate and second plate, an output side disc, which is a torque output side portion, a plurality of damper springs, a second frictional member, and a second biasing member. The first biasing member pushes the limiter plate so that the central disc is arranged between the limiter plate and the housing. The hub has a shaft hole arranged at a center of the damper device and fitted to an output member. The first plate and second plate are arranged at opposite sides of the central disc and coupled to the central disc. The first plate and second plate configure a torque input side portion with the central disc. The output side disc is fixed to the hub and arranged between the first plate and the second plate. The plurality of damper springs are accommodated in a spring accommodation hole formed between the first plate and the second plate. The damper springs elastically couple the torque input side portion and the output side disc. The second friction member is arranged between the output side disc and the torque input side portion. The second biasing member biases the second friction member. The second friction member suppresses relative rotation of the torque input side portion and the Output side disc that is greater than or equal to a certain level with slip friction generated when the damper springs deform.

Preferably, the first plate and the second plate are contactable in a slipping manner with an inner portion of the output side disc.

Preferably, the second friction member engages an engagement groove formed in at least one of the first plate and the second plate so as to be rotatable in a predetermined rotation angle range relative to at least one of the first plate and the second plate. The second friction member generates a slip friction when a relative rotation angle between the torque input side portion and the output side disc becomes greater than or equal to a certain angle.

Preferably, the output side disc is generally ring-shaped and includes a peripheral portion in which spring holders are arranged, in which two damper springs are arranged in series between adjacent ones of the spring holders. The ring-shaped central disc includes an inner portion supporting an intermediate member having an engagement groove. A separator projecting from an inner circumference of the intermediate member is arranged between the two damper springs. The second friction member engages the engagement groove of the intermediate member so as to be rotatable relative to the intermediate member in a predetermined rotation angle range. The second friction member generates slip friction when a relative rotation angle between the torque input side portion and the output side disc becomes greater than or equal to a certain angle.

Preferably, the hub includes a flange having first to third disc portions that are concentric and have different outer diameters. The second biasing member is attached to the first disc portion having the smallest diameter. A washer and the second friction member are attached to the second disc portion having an intermediate outer diameter. The washer and the second friction member are arranged between the output side disc and the third disc portion having the largest diameter in a state in which a biasing force of the second biasing member is applied. An engagement piece arranged in the washer engages with an engagement hole of the output side disc.

With the damper according to the present invention, the damper and limiter are arranged between a crankshaft and an input shaft when transmitting the torque of the crankshaft to the input shaft. This basic structure is the same as the prior art. The damper device arranges the central disc between the first plate and the second plate and includes the plurality of damper springs. Relative rotation of the central disc and the two plates compresses and deforms the damper springs. The first friction member is arranged on the outer circumference of the central disc. The biasing force of the first biasing member is applied to the limiter plate, which attaches the first friction member to the outer circumference, so as to generate frictional force with the first friction member. A disc spring is normally used as the first biasing member. However, the first biasing member is not particularly limited in such a manner.

The damper of the present invention is a wet type structure and thereby includes a housing, which houses the damper device. The housing is filled with lubricant oil. The housing is formed by welding the first cover and the second cover, which also function as a flywheel. The hub is attached to the center of the damper, and the input shaft is fitted to a shaft hole of the hub.

The central disc of the damper is arranged between the first plate and the second plate. However, an inner circumferential portion of the two plates is contactable in a slipping manner with the central disc, and a slight gap is provided at other regions so as not to contact the central disc. Further, the second friction member is attached in a sandwiched state so that biasing force is applied to the peripheral portion of the hub so as to suppress rotation. The second frictional member engages with the central disc, and frictional resistance is applied to the rotation of the central disc.

The second frictional member, which is engaged with the central disc, has a predetermined margin. However, the second friction member is forced so as to function when relative rotation of the first plate and second plate becomes greater than or equal to a certain angle. The second friction member is engaged with an intermediate member, which uses two damper springs arranged in series. The second friction member may be attached to engage the first plate and second plate, which serve as the torque output side portion. In addition, the attachment position is not limited to the outside of the hub.

The present invention may have a structure in which the first plate and second plate, which are arranged on opposite sides of the central disc, serve as a torque input side portion, and a discrete output side disc is arranged on the inner circumference of the torque input side portion. In this case, the second friction member may be arranged between the output side disc and the plate of the torque input side portion, and when biasing force is applied to the second friction member and deformation of the damper springs generate torsion rotation of the central disc of the torque input side portion and the output side disc that is greater than or equal to a certain level, the relative torsion rotation may be suppressed with slip friction.

The damper according to the present invention may be of a wet type structure in which the damper is accommodated in a housing, and the housing is filled with lubricant oil. Accordingly, the first friction member of the limiter always has a constant friction coefficient. In other words, the engagement surface of the first friction member does not rust, variation of the critical torque is suppressed, and the critical torque may be decreased. This allows for the setting of a relatively low critical torque. Thus, the diameter of a shaft forming a power transmission mechanism and a gear mechanism may be decreased, and the entire damper may be reduced in size.

The damper device in the damper according to the present invention includes a plurality of damper springs. The damper springs are compressed and deformed when impact torque acts on the central disc serving as a torque input side portion so as to alleviate the impact torque to absorb engine torque fluctuation. In such a case, when the compression of the damper springs rotates the first plate and second plate serving as a torque output side portion, the central disc is in contact with the two plates and the inner portion. Thus, a large slip friction torque is not generated. Further, the damper springs are elastically deformed in the lubricant oil. Thus, a large frictional resistance is not generated even when contacting the inner surface of an accommodation area of the plate.

Further, when the damper springs are compressed and deformed by a certain degree, the second friction member is rotated, and the second friction member to which biasing force is applied contacts the central disc or the two plates and generates a large frictional resistance. Accordingly, the damper alleviates the impact torque and absorbs energy produced by the impact torque. This readily attenuates and stops the elastic motion of the damper springs.

BEST MODE FOR CARRYING OUT THE INVENTION

A first embodiment of a damper, which is installed in a hybrid vehicle, according to the present invention will now be discussed with reference to FIGS. 1 to 5. In the description of the present specification hereinafter, the "front side" refers to the right side as viewed in FIG. 2, and the "rear side" refers to the left side as viewed in FIG. 2.

Figure 1:
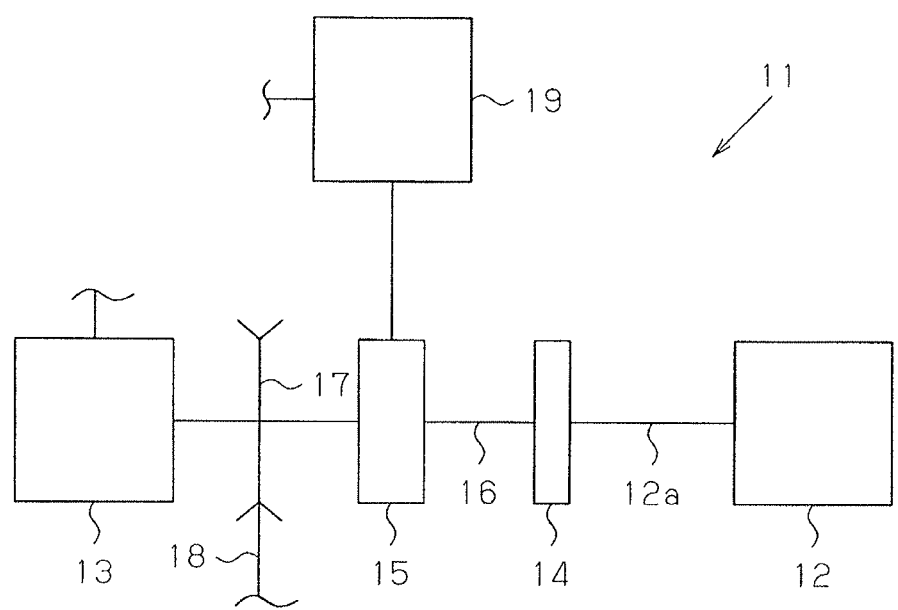
FIG. 1 is a schematic block diagram showing a hybrid system according to a first embodiment of the present invention.

As shown in FIG. 1, a hybrid drive device 11 mounted on the hybrid vehicle includes an engine 12, which is a first power source, an electric motor 13, which is a second power source driven by power supplied from a battery (not shown), and a damper 14, which absorbs fluctuation in the torque generated by the engine 12 and the electric motor 13 (hereinafter referred to as "torque fluctuation"). The hybrid drive device 11 also includes a planetary gear mechanism 15, to which the torque from the engine 12 transmitted via the damper 14 and the torque from the electric motor 13 are transmitted.

The planetary gear mechanism 15 includes a sun gear, a pinion gear, a planet carrier, and a ring gear (not shown). Torque transmitted by the damper 14 from the engine 12 is transmitted to the planet carrier via an input shaft 16, which serves as an output member. In a state in which torque is transmittable, the electric motor 13 and a sprocket 17 are coupled to the ring gear (not shown) of the planetary gear mechanism 15. When the ring gear is rotated by the torque from at least either one of the engine 12 and the electric motor 13, the torque is transmitted to a reduction gear mechanism (not shown) via the sprocket 17 and a chain 18 running around the sprocket 17. Furthermore, a power generation motor 19 is coupled to the sun gear (not shown) of the planetary gear mechanism 15. The power generation motor 19 generates power when torque is transmitted via the sun gear. The generated power is supplied to the battery via an inverter (not shown). In other words, the battery is charged when the power generation motor 19 is driven.

When the engine 12 is driven, the torque from the engine 12 is transmitted to the planetary gear mechanism 15 through the damper 14, and the planet carrier of the planetary gear mechanism 15 rotates. The rotation of the planet carrier rotates the ring gear and transmits the torque from the engine 12 to the sprocket 17. When the sprocket 17 rotates, the torque from the engine 12 is transmitted to drive wheels by the chain 18, the reduction gear mechanism, and the like thereby moving the vehicle. In this state, the sun gear is also rotated by the rotation of the planet carrier in the planetary gear mechanism 15. This drives the power generation motor 19 and charges the battery.

When the engine 12 stops running and the electric motor 13 is driven, torque is transmitted from the electric motor 13 to the ring gear of the planetary gear mechanism 15, and the rotation of the ring gear rotates the sprocket 17. When the sprocket 17 rotates, the torque from the electric motor 13 is transmitted to the drive wheels by the chain 18, the gear reduction mechanism, and the like thereby moving the vehicle. In this state, the torque from the electric motor 13 is not transmitted to the engine 12. In the hybrid drive device 11, the engine 12 and the electric motor 13 may both be driven to move the vehicle.

The damper 14 of the present embodiment will now be discussed with reference to FIGS. 1 to 5.

Figure 2:
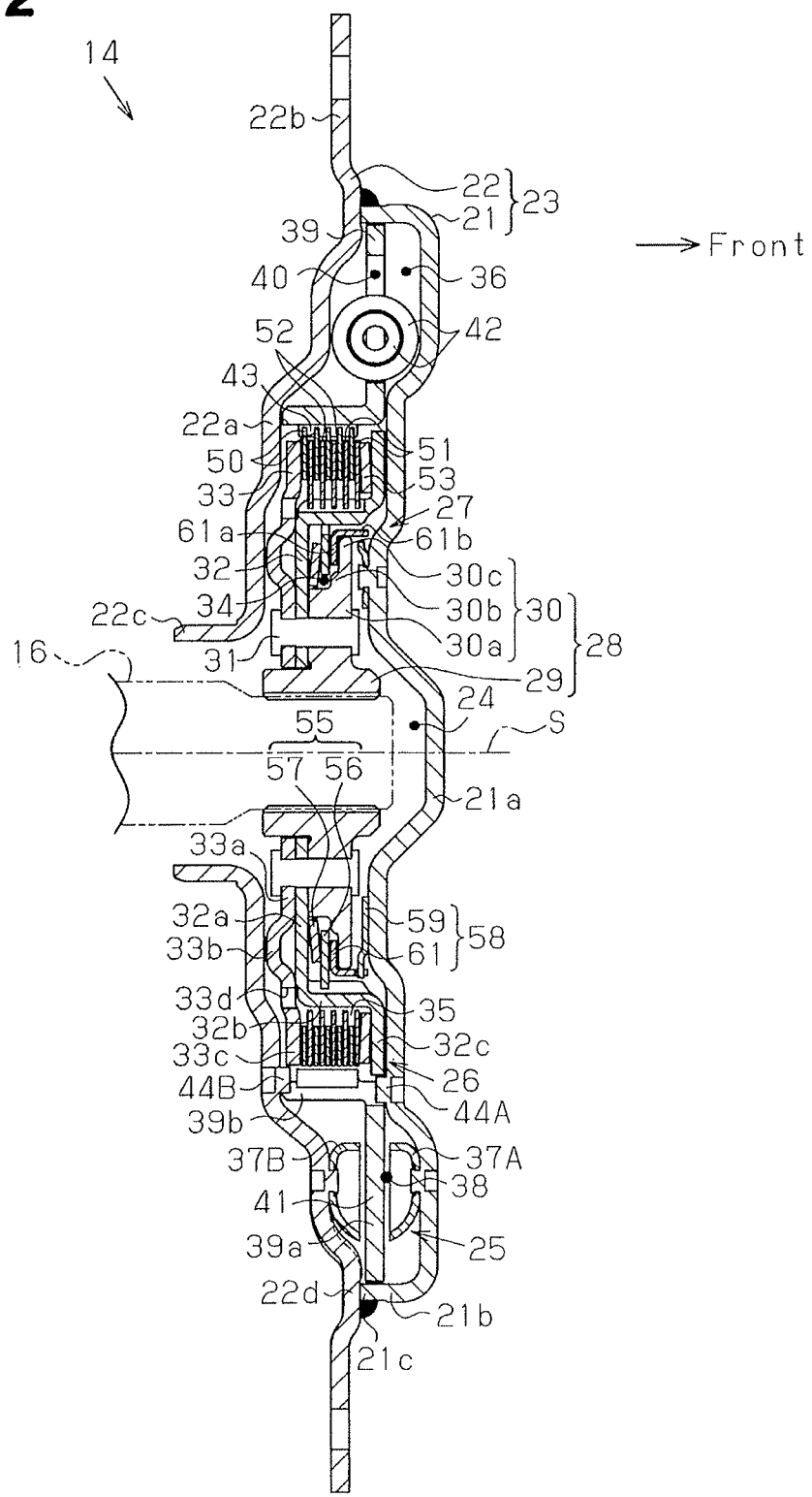
FIG. 2 is a cross-sectional view showing a damper of FIG. 1.

Referring to FIGS. 1 and 2, the damper 14 of the present embodiment is arranged in a torque transmission path, which transmits the torque from the engine 12 to the input shaft 16 of the planetary gear mechanism 15. The input shaft 16 is rotatable about a predetermined axis S (shown by a single-dash line in FIG. 2), which extends toward the front and rear of the vehicle. Specifically, the damper 14 includes an outer case 23 serving as a housing. The outer case 23 includes a front cover (first cover) 21, which is generally cylindrical and has a closed bottom, and a rear cover (second cover) 22, which is generally annular when viewed from the front. A lubricant oil accommodation chamber 24, which serves as a liquid accommodation chamber, is formed between the covers 21 and 22 in the outer case 23. The lubricant oil accommodation chamber 24 is filled with lubricant oil serving as a liquid. In the lubricant oil accommodation chamber 24, a damper device 25, a limiter mechanism 26, and a hysteresis mechanism 27 are arranged in this order from the outer side towards the inner side with respect to the radial direction of the damper 14, which is orthogonal to the axis S.

The front cover 21 includes a bottom portion 21a, which is generally disc-shaped when viewed from the front and which center conforms to the axis S, and a cylindrical portion 21b, which is formed integrally with the bottom portion 21a. The cylindrical portion 21b has a rear end (first fixing portion) 21c welded to the rear cover 22.

The rear cover 22 includes a main cover body 22a, and mount 22b, and a sleeve 22c. The main cover body 22a is generally annular when viewed from the front. The mount 22b has a flange-shape and is located radially outward from the main cover body 22a. The sleeve 22c projects toward the rear from a radially inner portion of the main cover body 22a. The main cover body 22a, the mount 22b, and the sleeve 22c are formed integrally. The main cover body 22a includes an outer portion (second fixing portion) 22d, which is welded to the rear end 21c of the cylindrical portion 21b of the front cover 21. The mount 22b of the rear cover 22 is coupled to a crankshaft 12a (see FIG. 1), which is an output shaft of the engine 12, by a drive plate (not shown). The outer case 23, to which torque is transmitted from the engine 12, rotates in a predetermined rotation direction R (see FIG. 2) about the axis S.

The input shaft 16 of the planetary gear mechanism 15 has an axially middle portion located in the sleeve 22c of the rear cover 22. Further, the input shaft 16 has a front end located in the lubricant oil accommodation chamber 24. The front end of the input shaft 16 has a circumferential portion that supports a hub 28, which serves as a coupling member, so that the hub 28 is integrally rotatable with the input shaft 16. Specifically, the hub 28 is spline-fitted to the input shaft 16. The hub 28 includes a hub tube 29, the center of which conforms to the axis S, and a hub flange 30, which is located at the circumferential side of the hub tube 29 and at the axially middle part of the hub tube 29. The hub tube 29 and the hub flange 30 are formed integrally.

The hub flange 30 includes a first disc portion 30a, which is located at the most radially inward side, a second disc portion 30b, which is located at the radially outward side of the first disc portion 30a, and a third disc portion 30c, which is located at the radially outward side of the second disc portion 30b. The axial length of the first disc portion 30a is the longest among the first to third disc portions 30a to 30c, and the axial length of the second disc portion 30b is longer than that of the third disc portion 30c. In other words, the hub flange 30 is formed such that the axial length becomes shorter towards the radially outward side.

Two plates 32 and 33 arranged next to each other in the axial direction are fixed to the first disc portion 30a by a plurality of (only two shown in FIG. 2) rivets 31. The rivets 31 are arranged along a circumferential direction of the hub 28 about the axis S. Thus, the two plates 32 and 33 are rotated integrally with the hub 28. The first plate 32, which serves as a supporting member, is arranged in front of the second plate 33. Further, the first plate 32 includes an annular first base portion 32a, which is supported by the hub 28 and which center conforms to the axis S, a first cylindrical portion 32b, which extends towards the front from a circumferential end of the first base portion 32a, and a first collar portion 32c, which is disc-shaped and extends radially from the front end of the first cylindrical portion 32b. The first base portion 32a, the first cylindrical portion 32b, and the first collar portion 32c are formed integrally. The first cylindrical portion 32b is formed so that its center conforms to the axis S and is arranged radially outward from the hub flange 30. The first collar portion 32c is arranged such that a slight gap is formed between its front surface and the bottom portion 21a of the front cover 21. Lubricant oil is held in the gap. Further, an annular hysteresis accommodation chamber 34, which serves as an installation space, is formed between the hub flange 30 and the first base portion 32a in the axial direction. The hysteresis accommodation chamber 34 has an axial length that becomes longer radially outward.

The second plate 33, which is located at the rear side of the first plate 32, extends about the axis S and is generally annular when viewed from the front. The radially inner side of the second plate 33 defines a second base portion 33a, which contacts the first base portion 32a of the first plate 32. The second plate 33 includes an intermediate portion 33b located radially outward and rearward from the second base portion 33a. A slight gap is formed between the intermediate portion 33b and the main cover body 22a of the rear cover 22. The radially outward portion of the intermediate portion 33b in the second plate 33 defines an annular second collar portion 33c, which is located at substantially the same axial position as the second base portion 33a. A plurality of (only two shown in FIG. 2) through-holes 33d are arranged at equal intervals along the circumferential direction about the axis S between the intermediate portion 33b and the second collar portion 33c in the radial direction in the second plate 33. An annular limiter accommodation chamber 35 is formed between the collar portions 32c and 33c in the axial direction.

Figure 3:
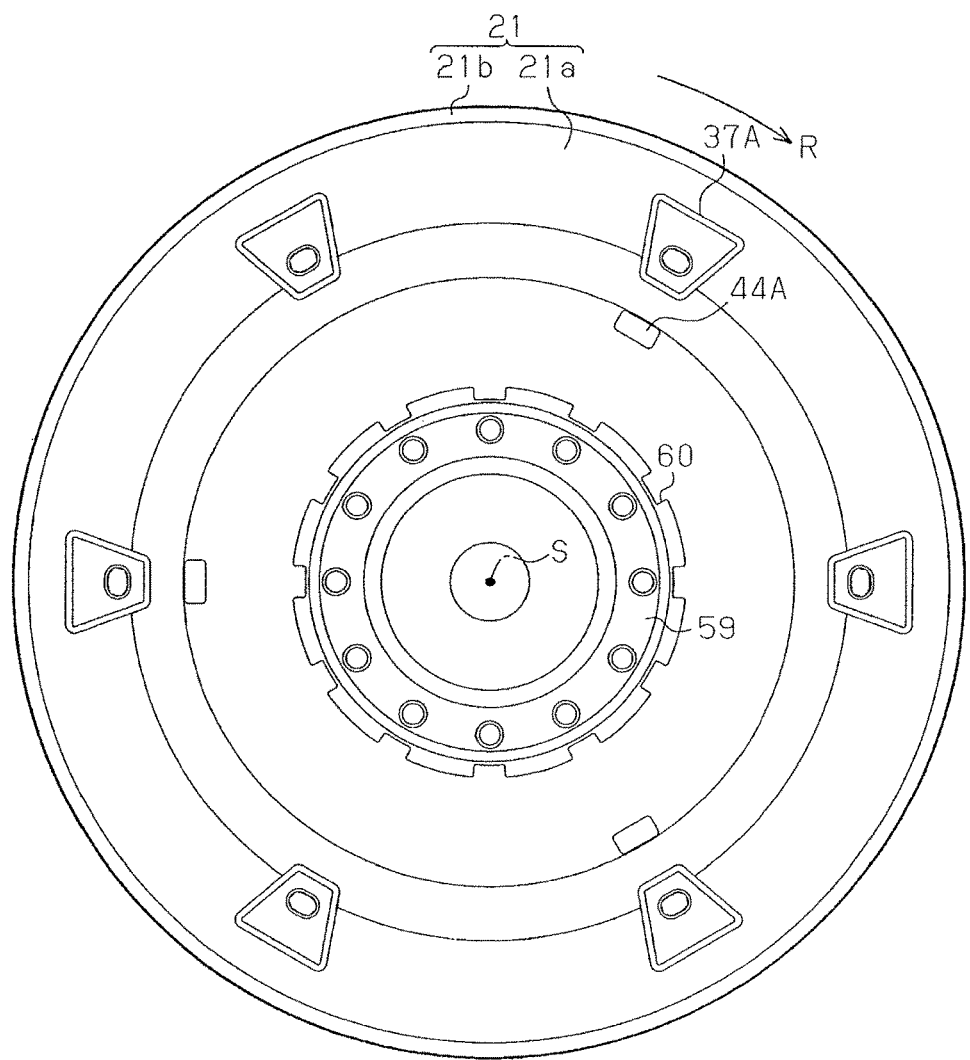
FIG. 3 is a plan view showing a front cover of FIG. 2 from the rear.

The damper device 25 is arranged in a damper accommodation chamber 36, which is formed radially outward from the limiter accommodation chamber 35 in the lubricant oil accommodation chamber 24. As shown in FIGS. 2 and 3, the damper device 25 includes a plurality of (six in the present embodiment) first torque transmission units 37A and a plurality of (six in the present embodiment) first torque transmission units 37B. The first torque transmission units 37A are arranged on the radially outer part of the bottom portion 21a of the front cover 21. The first torque transmission units 37B are arranged on the radially outer part of the main cover body 22a of the rear cover 22. The first torque transmission units 37A are arranged on the front cover 21 at equal intervals in the circumferential direction. The first torque transmission units 37B are arranged on the rear cover 22 are arranged in correspondence with the first torque transmission units 37A in the circumferential and radial directions. A gap 38 is formed between each set of corresponding first torque transmission units 37A and 37B aligned in the axial direction so as to accommodate a main disc body 39a of a damper disc 39, which will be described later.

Figure 4:
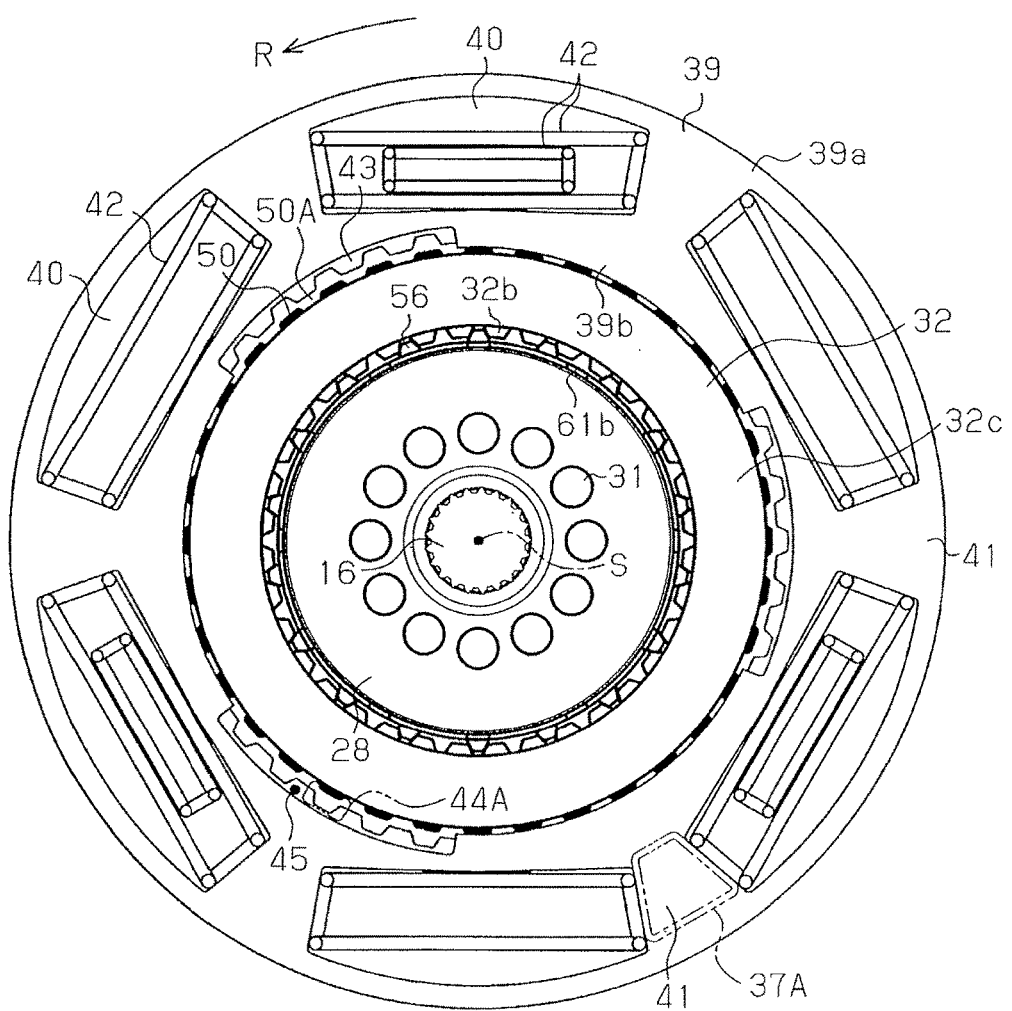
FIG. 4 is a plan view showing the interior of a damper from the front cover.

As shown in FIGS. 2 and 4, the damper device 25 includes the damper disc 39, which is generally annular when viewed from the front and has a center that conforms to the axis S. The damper disc 39 includes the main disc body 39a having an annular shape. The main disc body 39a is arranged in the gap 38 free from contact with the first torque transmission units 37A and 37B. In the main disc body 39a, a plurality of (six in the present embodiment) spring accommodation holes 40 are arranged at equal interval in the circumferential direction and are formed at substantially the same radial position as the first torque transmission units 37A and 37B. Each spring accommodation hole 40 is located between adjacent ones of the first torque transmission units 37A and 37B in the circumferential direction. This forms second torque transmission units 41 at circumferential positions substantially corresponding to the first torque transmission units 37A and 37B in the main disc body 39a. Each spring accommodation hole 40 accommodates a damper spring 42 serving as an elastic member that is elastic in the circumferential direction.

The damper disc 39 includes a plurality of (three in the present embodiment) extensions 39b extending rearward from a radially inner portion of the main disc body 39a. The extensions 39b are each formed to have a generally arcuate shape when seen from the front and are arranged at equal intervals in the circumferential direction. In other words, the extensions 39b is arranged to surround the limiter accommodation chamber 35. At the radially inner portion of the damper disc 39, a support 43, which is supported to be integrally rotatable with the damper disc 39, supports a plurality of first limiter plates 50, which will be described later, of the limiter mechanism 26.

When the outer case 23 rotates in the predetermined rotation direction R, the damper springs 42 are pushed by the first torque transmission units 37A and 37B that are located at the upstream side with respect to the rotation direction R. In other words, torque is transmitted from the first torque transmission units 37A and 37B to the damper spring 42. The damper springs 42 then push the second torque transmission units 41 of the damper disc 39 located at the downstream side with respect to the rotation direction R and transmit torque from the first torque transmission units 37A and 37B toward the damper disc 39. This rotates the damper disc 39 in the predetermined rotation direction R. In other words, the torque from the engine 12 is transmitted to the limiter mechanism 26 via the outer case 23 and the damper device 25.

As shown in FIGS. 2 and 3, the damper device 25 includes a plurality of (three in the present embodiment) projections 44A and a plurality of (three in the present embodiment) projections 44B. The projections 44A are formed radially inward from the first torque transmission units 37A on the bottom portion 21a of the front cover 21. The projections 44B are formed radially inward from the first torque transmission unit 37B on the main cover body 22a of the rear cover 22. The projections 44B are arranged at the same radial positions as the corresponding projections 44A. The projections 44A and 44B are respectively arranged between adjacent ones of the extensions 39b in the circumferential direction. In other words, referring to FIGS. 3 and 4, the projections 44A and 44B are each rotatable relative to the damper disc 39 in a space 45 between adjacent ones of the extensions 39b in the circumferential direction.

As shown in FIG. 2, the limiter mechanism 26 is arranged in the limiter accommodation chamber 35. The limiter mechanism 26 includes a plurality of (five in FIG. 2) first limiter plates (input side portion) 50. The first limiter plates 50 are supported by the support 43, which is located radially inward from the damper disc 39, so as to be movable in the axial direction and integrally rotatable with the support. Specifically, as shown in FIG. 2, the first limiter plates 50 are supported by the support 43 of the damper disc 39 by an elastic ring member 50A. Each first limiter plate 50 has an annular shape. A first friction member 52 is arranged on both axial sides of the first limiter plate 50.

The limiter mechanism 26 also includes a plurality of (five in FIG. 2) second limiter plates (output side portion) 51. The second limiter plates 51 are supported by the cylindrical portion 32b of the first plate 32 so as to be movable in the axial direction and integrally rotatable with the cylindrical portion 32b. Each second limiter plate 51 has an annular shape and is arranged between adjacent ones of the first limiter plates 50 in the axial direction and in front of the most frontward first limiter plate 50. In other words, each second limiter plate 51 is arranged to face toward the first limiter plate 50 that are adjacent in the axial direction.

The limiter mechanism 26 further includes a limiter disc spring 53 serving as a limiter biasing member supported by the first collar portion 32c of the first plate 32. The limiter disc spring 53 applies a biasing force rearwards to the limiter plates 50 and 51 so that the first friction members 52 push each first limiter plate 50 against the second limiter plates 51 located in front and rear of the first limiter plate 50. In other words, each first limiter plate 50 is sandwiched by the second limiter plates 51 that are located at the front and rear sides of the first limiter plate 50. In this state, the biasing force applied toward the front from the limiter disc spring 53 is absorbed by the first collar portion 32c of the first plate 32. Thus, the biasing force of the limiter disc spring 53 is not applied to the front cover 21. The second plate 33 is configured to absorb the biasing force applied towards the rear side from the limiter disc spring 53 to the second collar portion 33c by the limiter plates 50 and 51. Thus, the biasing force from the limiter disc spring 53 is not applied to the rear cover 22.

Accordingly, in the present embodiment, the first plate 32 and the second plate 33 form a separation restriction member for restricting relative movement of the front cover 21 and the rear cover 22 in a direction in which they are separated from each other (axial direction) by the biasing force of the limiter disc spring 53. The hub 28 supporting the first plate 32 and the second plate 33 also functions as a downstream side member located at the downstream side of the limiter mechanism 26 in the torque transmission path. The first collar portion 32c of the first plate 32 functions as a first restriction portion arranged at one axial side (front side) of the limiter mechanism 26, and the second collar portion 33c of the second plate 33 functions as a second restriction portion arranged at the other axial side (rear side) of the limiter mechanism 26.

As shown in FIG. 2, the hysteresis mechanism 27 is arranged in the damper 14 radially inward from the limiter mechanism 26. Such hysteresis mechanism 27 includes a friction generation unit 55 arranged in the hysteresis accommodation chamber 34. The friction generation unit 55 includes an annular second friction member (contact member) 56 and a hysteresis disc spring 57, which serves as a hysteresis biasing member. The second friction member 56 is supported by the first cylindrical portion 32b of the first plate 32 so as to be movable in the axial direction and integrally rotatable with the first cylindrical portion 32b. The hysteresis disc spring 57 is arranged on the rear side of the second friction member 56. The hysteresis disc spring 57 is supported by the first base portion 32a of the first plate 32 and applies a frontward biasing force to the second friction member 56.

Figure 5:
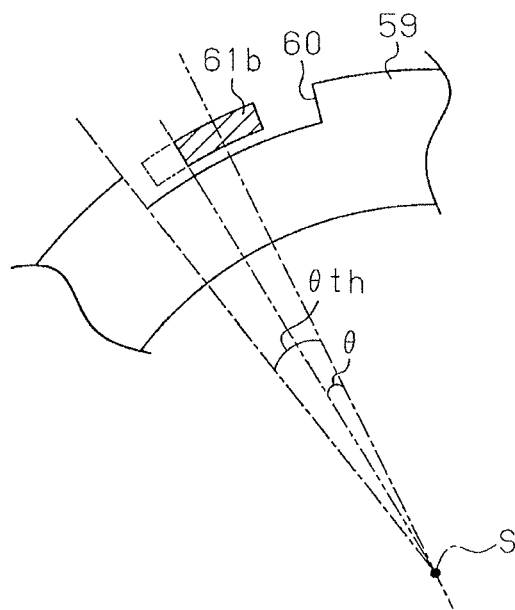
FIG. 5 is a schematic plan view showing part of a rotation unit in a hysteresis mechanism of FIG. 2.

The hysteresis mechanism 27 also includes a rotation unit 58 for obtaining a state in which the torque from the case 23 is directly transmittable to the hub 28 when a rotation difference θ (also referred to as "torsion angle") of the outer case 23 and the hub 28 becomes equal to a predetermined rotation difference θth (see FIG. 5). As shown in FIGS. 2 and 3, the rotation unit 58 includes an annular hysteresis plate 59, which is supported to be integrally rotatable with the bottom portion 21a of the front cover 21. A plurality of (twelve in the present embodiment) engagement recesses 60 formed at equal intervals in the circumferential direction about the axis S as the center is formed in the outer circumference of the hysteresis plate 59.

The rotation unit 58 includes a hysteresis washer 61 arranged on the front side of the second friction member 56 in the hysteresis accommodation chamber 34. The hysteresis washer 61 is arranged to be rotatable relative to the hub 28. The hysteresis washer 61 includes a washer body 61a, which serves as an annular contacted portion. A plurality of engagement pieces 61b corresponding to the engagement recesses 60 project frontward from the Outer circumference edge of the washer body 61a. As shown in FIGS. 4 and 5, the engagement pieces 61b are arranged at equal intervals along the circumferential direction of the hysteresis plate 59. Each engagement piece 61b has a distal end (front end) arranged in the corresponding engagement recess 60. When the rotation difference θ of the outer case 23 and the hub 28 becomes equal to a predetermined rotation difference θth, each engagement piece 61b engages a circumferential end of the engagement recess 60 so that the hysteresis washer 61 rotates with the outer case 23. In this case, a frictional force that reduces the force for rotating the hysteresis washer 61 and the outer case 23 (also referred to as "rotation force") and decreases the rotation difference θ of the outer case 23 and the hub 28 is generates between the washer body 61a of the hysteresis washer 61 and the second friction member 56, which presses the washer body 61a.

In FIG. 5, the width in the circumferential direction of the engagement recess 60 and the size of the engagement piece 61b arranged in the engagement recess 60 are shown in an exaggerated manner to facilitate understanding of the description.

The operation of the damper 14 of the present embodiment will now be discussed.

When torque is transmitted from the engine 12 to the outer case 23, the outer case 23 rotates in the predetermined rotation direction R. This also rotates the damper device 25 so that the torque from the engine 12 is transmitted to the limiter mechanism 26 by the outer case 23 and the damper device 25. In this case, frictional force is generated between the adjacent limiter plates 50 and 51 in the axial direction. Thus, the second limiter plate 51 rotates in the predetermined rotation direction R with the first limiter plate 50. The rotation of the second limiter plates 51 then rotate the hub 28 and the input shaft 16 of the planetary gear mechanism 15. In other words, the torque from the engine 12 is transmitted to the planetary gear mechanism 15.

When torque that is greater than the frictional force, which is generated between the adjacent limiter plates 50 and 51 arranged on opposite sides of the first friction member 52, is transmitted to the first limiter plate 50 of the limiter mechanism 26 via the damper device 25, the limiter plates 50 and 51 slip against one another. In other words, the torque transmission to the input shaft 16 of the planetary gear mechanism 15 is blocked by the limiter mechanism 26.

The hysteresis mechanism 27 functions when the torque fluctuation that cannot be absorbed by the damper spring 42 of the damper device 25 is transmitted to the damper 14 and the rotation difference θ of the outer case 23 and the hub 28 becomes equal to the predetermined rotation difference θth. Specifically, each engagement piece 61b of the hysteresis washer 61 engages the circumferential end of the corresponding engagement recess 60 in the hysteresis plate 59. In this case, a frictional force that reduces the rotation force of the outer case 23 is generated by the biasing force from the hysteresis disc spring 57 between the washer body 61a of the hysteresis washer 61 and the second friction member 56. As a result, the hysteresis washer 61 rotated when the outer case 23 rotates slides along the second friction member 56. The sliding speed of the hysteresis washer 61 is lowered by the frictional force generated between the washer body 61a and the second friction member 56. In other words, the torque fluctuation transmitted to the damper 14 is absorbed by the hysteresis mechanism 27.

Further, the hysteresis mechanism 27 does not function when the rotation difference θ of the outer case 23 and the hub 28 is less than the predetermined rotation difference θth. In this state, the rotation of the outer case 23 is not restricted by the hysteresis mechanism 27. Thus, torque is transmitted from the engine 12 to the planetary gear mechanism 15 via the damper 14 with high efficiency.

Accordingly, the present embodiment has the advantages described below.

(1) The plates 32 and 33 arranged on opposite sides of the limiter disc spring 53 in the axial direction of the limiter mechanism 26 suppress relative movement of the covers 21 and 22 in directions in which they are moved away from each other by the biasing force of the limiter disc spring 53 of the limiter mechanism 26. In other words, when joining the covers 21 and 22 in a state in which the damper device 25 and the limiter mechanism 26 are accommodated in the lubricant oil accommodation chamber 24, relative movement of the covers 21 and 22 in directions in which they are moved away from each other in the axial direction is suppressed. Thus, the front cover 21 does not need to be pressed against the rear cover 22. This facilitates alignment of the front cover 21 with the rear cover 22 in the axial direction. Since pressing force does not have to be applied to at least one of the covers 21 and 22, the welding of the covers 21 and 22 may be easily performed. In comparison with the prior art in which the front cover 21 must be pressed against the rear cover 22, deformation of the front cover 21 and the rear cover 22 is suppressed during assembling.

(2) The axial dimension of the limiter accommodation chamber 35 accommodating the limiter mechanism 26 does not change even if the biasing force of the limiter disc spring 53 is applied to at least one of the plates 32 and 33 supported by the hub 28. The biasing force from the limiter disc spring 53 is thus not applied to the covers 21 and 22. Therefore, the front cover 21 may be maintained at a predetermined position relative to the rear cover 22 without pressing the front cover 21 against the rear cover 22 during assembling.

(3) The plates 32 and 33 forming the separation restriction member are supported by the hub 28 in a state immovable in the axial direction. The hub 28 thus does not move in the axial direction even if the biasing force from the limiter disc spring 53 is applied to the plates 32 and 33. This restricts the force that moves away the covers 21 and 22 from each other generated from the biasing force of the limiter disc spring 53.

(4) The limiter mechanism 26 is arranged in the damper 14 radially inward from the damper device 25. This contributes to further miniaturization of the damper 14 in the radial direction compared to when the limiter mechanism 26 is arranged radially outward from the damper device 25 in the damper 14.

(5) The hysteresis mechanism 27 is arranged in the damper 14 radially inward from the damper device 25 and the limiter mechanism 26. This contributes to further miniaturization of the damper 14 in the radial direction compared to when the hysteresis mechanism 27 is arranged radially outward from the damper device 25 and the limiter mechanism 26 in the damper 14.

(6) When the rotation difference θ of the outer case 23 and the hub 28 becomes equal to the predetermined rotation difference θth, a frictional force that suppresses the rotation of the outer case 23 is generates between the friction generation unit 55 and the washer body 61a. Thus, even if fluctuation in the torque transmitted to the outer case 23 is such that the rotation difference θ of the outer case 23 and the hub 28 becomes equal to the predetermined rotation difference θth, such torque fluctuation is absorbed by the hysteresis mechanism 27.

(7) The friction generation unit 55 of the hysteresis mechanism 27 is arranged in the hysteresis accommodation chamber 34 between the hub flange 30 of the hub 28 and the first plate 32. Thus, the biasing force from the hysteresis disc spring 57 of the friction generation unit 55 does not act on the outer case 23. That is, the biasing force from the hysteresis disc spring 57 does not cause force to act on at least one of the covers 21 and 22 in a direction moving away the covers 21 and 22 from each other. In other words, when joining the covers 21 and 22 in a state in which the damper device 25, the limiter mechanism 26, and the hysteresis mechanism 27 are accommodated in the lubricant oil accommodation chamber 24, relative movement of the covers 21 and 22 in the axial direction in which the covers 21 and 22 move away from each other is suppressed. Thus, the front cover does not have to be pressed against the rear cover 22. This facilitates alignment of the front cover 21 in the axial direction with respect to the rear cover 22. Further, since pressing force does not have to be applied to at least one of the covers 21 and 22, the welding of the covers 21 and 22 is facilitated. Compared to the prior art in which the front cover 21 must be pressed against the rear cover 22, deformation of the front cover 21 and the rear cover 22 during assembling is suppressed.

(8) Generally, a damper device includes a drive member, which is discrete from the two covers forming the outer case, and the drive member includes a first torque transmission unit. The damper device 25 of the present embodiment does not include the drive member, and the first torque transmission units 37A and 37B are directly arranged on the outer case 23. Thus, compared to the damper of the prior art that includes the damper device, the damper 14 may be miniaturized in the axial direction since less components are arranged along the axial direction.

The first embodiment may be modified as described below.

The damper device 25 may include an annular drive member supported to be integrally rotatable with a member (outer case 23 in the first embodiment) arranged on the upstream side of the damper device 25 in the torque transmission path. In this case, the first torque transmission units are arranged on the drive member instead of the front cover 21 and the rear cover 22. In such a structure, the damper 14 may be easily assembled since the biasing force from the disc springs 53 and 57 is not applied to the covers 21 and 22 although the entire length in the axial direction of the damper 14 becomes longer than the above-described embodiment.

The first torque transmission unit 37A may extend radially inward from the cylindrical portion 21b of the front cover 21.

The first torque transmission unit 37A may be integrally formed with the front cover 21. In the same manner, the first torque transmission unit 37B may be integrally formed with the rear cover 22.

Either the first torque transmission unit 37A or the first torque transmission unit 37B may be eliminated.

The hysteresis mechanism 27 may have a configuration in which a region corresponding to the washer body 61a of the hysteresis washer 61, a region corresponding to the second friction member 56, and a region corresponding to the hysteresis biasing member 57 are arranged along the radial direction of the damper 14. In such a structure, the biasing force from the hysteresis biasing member does not act on the covers 21 and 22.

The hysteresis mechanism 27 may be eliminated from the damper 14. Alternatively, in the damper 14, the hysteresis mechanism 27 may be arranged radially outward from the limiter mechanism 26 or radially outward from the damper device 25.

Figure 6:
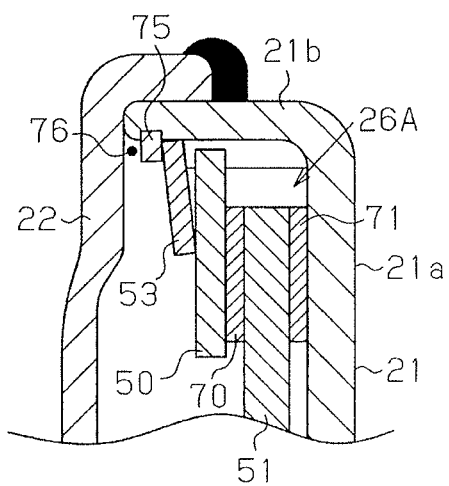
FIG. 6 is a schematic cross-sectional view showing another example of a limiter mechanism according to the first embodiment of the present invention.

The limiter mechanism 26 may be arranged radially outward from the damper device 25. For example, as shown in FIG. 6, if a snap ring 75 is arranged in the rear side of the cylindrical portion 21b of the front cover 21, a limiter mechanism 26A may be arranged between the bottom portion 21a of the front cover 21 and the snap ring 75 in the axial direction. The limiter mechanism 26A includes the limiter disc spring 53, the first limiter plate 50, and the second limiter plate 51. The limiter disc spring 53 is supported by the snap ring 75. The first limiter plate 50 is supported by the cylindrical portion 21b of the front cover 21 to be movable in the axial direction. The second limiter plate 51 is supported by the damper device 25, which is arranged radially inward from the limiter mechanism 26A. A third friction member 70 and a fourth friction member 71 are respectively arranged on opposite sides of the second limiter plate 51 in the axial direction. The third friction member 70 slides along the first limiter plate 50, and the fourth friction member 71 slides along the bottom portion 21a of the front cover 21. The snap ring 75 prevents the first limiter plate 50 from being separated from the front cover 21. The limiter disc spring 53 is supported by the snap ring 75, and the limiter disc spring 53 applies a rearward biasing force to the snap ring 75. Furthermore, a gap 76 is formed between the snap ring 75 and the rear cover 22.

In such a structure, the limiter disc spring 53 applies frontward biasing force to the bottom portion 21a of the front cover 21. Further, the limiter disc spring 53 applies rearward biasing force to the snap ring 75. In other words, the limiter disc spring 53 does not apply force to the front cover 21 that moves it away from the rear cover 22. It is obvious that the limiter disc spring 53 also does not apply force to the rear cover 22 that moves it away from the front cover 21. Thus, pressing force for forcing the front cover 21 toward the rear cover 22 does not need to be applied when joining the front cover 21 to the rear cover 22. Accordingly, the damper 14 can be easily assembled. In such a structure, the bottom portion 21a of the front cover 21 and the snap ring 75 form the separation restriction member. The bottom portion 21a functions as a first restriction portion, and the snap ring 75 functions as a second restriction portion.

The collar portions 32c and 33c (i.e., plates 32 and 33) may be slightly deformed by the biasing force of the limiter disc spring 53. In such a case, the deformed collar portions 32c and 33c contact the covers 21 and 22, respectively. In such a structure, the biasing force of the limiter disc spring 53 applied to the covers 21 and 22 is much smaller than that of the prior art. Therefore, a pressing force acting to move the covers 21 and 22 away from each other is subtly applied to the covers 21 and 22.

The covers 21 and 22 may be fixed together through fixing processes other than welding. For instance, the covers 21 and 22 may be fixed to each other by rivets. In such a case, a seal ring (e.g., O-ring) for preventing the leakage of lubricant oil from the outer case 23 is preferably arranged at a region of contact between the covers 21 and 22. Such a structure obtains the same advantages as the first embodiment.

A second embodiment of the present invention will now be discussed with reference to FIGS. 7 to 12.

Figure 7:
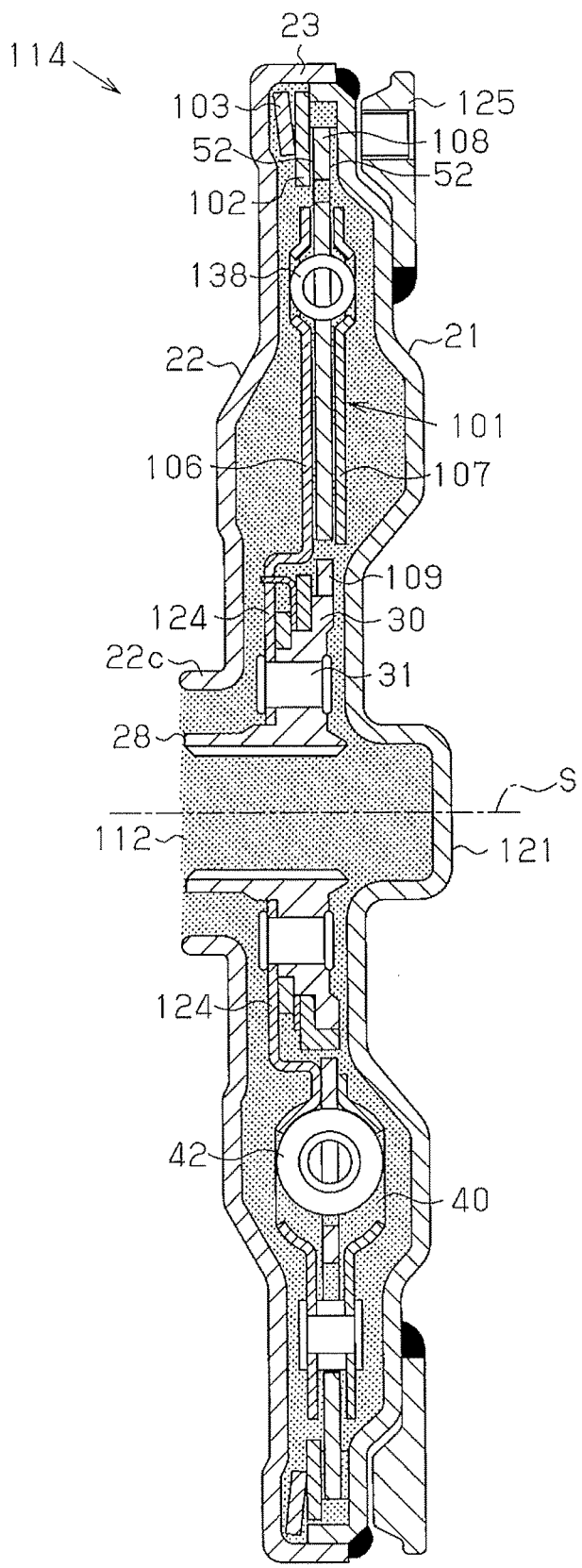
FIG. 7 is a cross-sectional view showing a damper according to a second embodiment of the present invention.

FIG. 7 is a cross-sectional view showing a damper 114 according to the present invention. In FIG. 7, reference number 101 denotes a damper device, reference number 102 denotes a limiter plate, reference number 103 denotes a limiter disc spring serving as a first biasing member, and reference number 23 denotes an outer case serving as a housing. The damper 114 has the same basic structure as a damper used in a torque converter. The damper 114 includes a plurality of damper springs 42. Each damper spring 42 is arranged between a first plate 106 and a second plate 107 and accommodated in a spring accommodation hole 40 formed by the first plate 106 and the second plate 107. Each of the first plate 106 and the second plate 107 has an inner circumference portion that is located radially inward from the spring accommodation hole 40 and an outer circumferential portion that is located radially outward from the spring accommodation hole 40.

A circular central disc 108 is arranged between the first plate 106 and the second plate 107. The damper spring 42 are elastically deformed when the central disc 108 rotates relative to the first plate 106 and the second plate 107. As shown in FIG. 7, the first plate 106 and the second plate 107 are formed in such a manner that each of the outer circumference portions is arranged at a distance from the central disk 108 in the axis S so as not to contact with the central disk 108, while the inner circumference portions are contactable in a slipping manner with the central disk 108. An intermediate member 109 is arranged radially inward from the central disc 108 and coupled to two damper springs 42, which are paired and arranged in series. A first friction member 52 is arranged at the peripheral portion of the central disc 108 on each of the two surfaces that are opposed to each other in the axial direction. The ring-shaped limiter plate 102 is arranged at the peripheral portion of on one side of the central disc 108. The limiter disc spring 103 arranged between the outer case 23 and the limiter plate 102 applies biasing force to the limiter plate 102. The outer diameter of the central disc 108 may be reduced, and a circumferential plate formed from a material allowing easy arrangement of the first friction member 52 may be attached to the outer circumference of the central disc 108 in lieu of the central disc 108.

Figure 8:
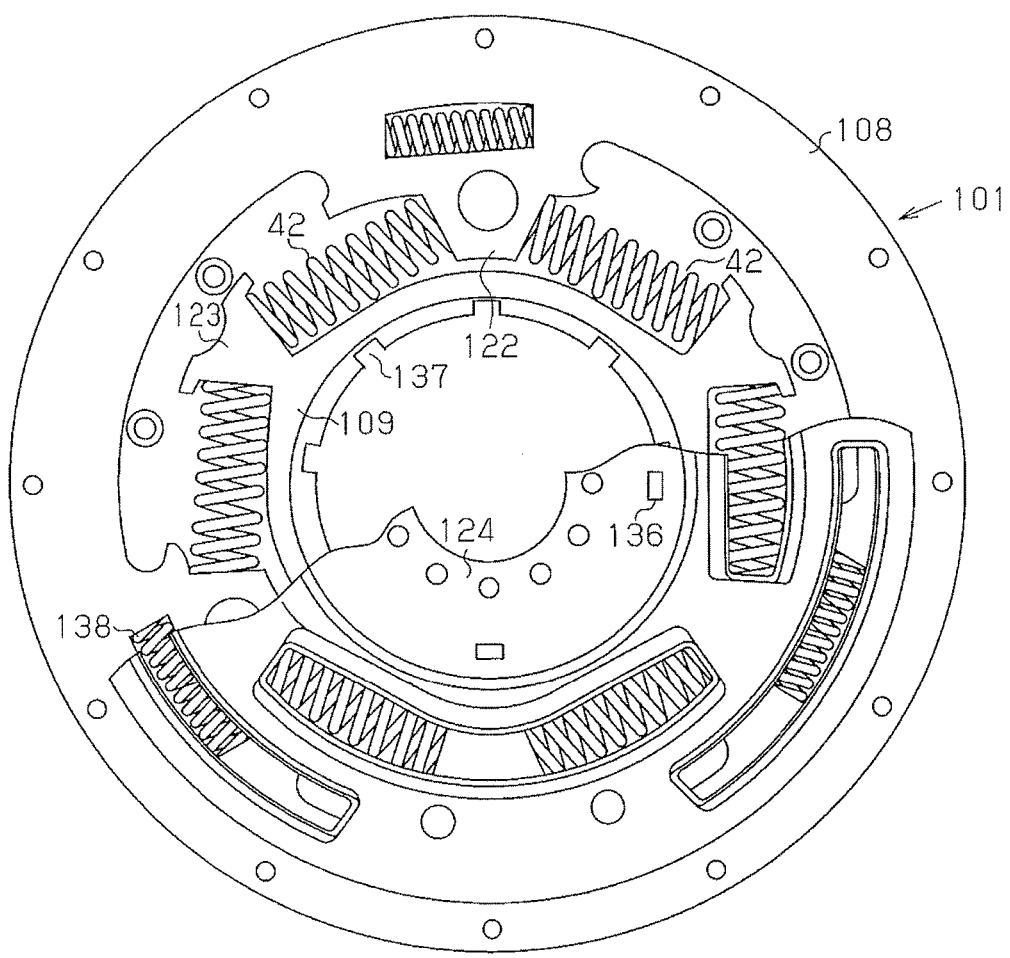
FIG. 8 is a partially cross-sectional plan view showing the damper device of FIG. 7.

FIG. 8 is a front view (include partial cross-section) showing the damper device 101 alone. A plurality of spring holders 122 project radially inward from the ring-shaped central disc 108, and two damper springs 42 are arranged in series between the adjacent spring holders 122. A separator 123 is arranged between the damper springs 42 that are arranged in series. The separator 123 projects out from the outer circumference of the ring-shaped intermediate member 109, which is supported by a hub flange 30 of a hub 28. Accordingly, when the rotation of the central disc 108 relative to the first plate 106 and the second plate 107 is fast, the damper springs 42 are compressed. However, in such a case, the intermediate member 109 rotates and thereby uniformly compresses the damper springs 42 that are arranged in series.

The hub 28, which includes a shaft hole 112, is arranged at the center of the damper 114, and the hub 28 is fixed to an inner portion 124 of the first plate 106. The outer case 23 is formed by welding the front cover 21, which serves as the first cover and functions as a fly wheel, to the rear cover 22, which serves as the second cover. A sleeve 22c is formed at the center of the rear cover 22. The sleeve 22c and the hub 28 are concentric.

Figure 9:
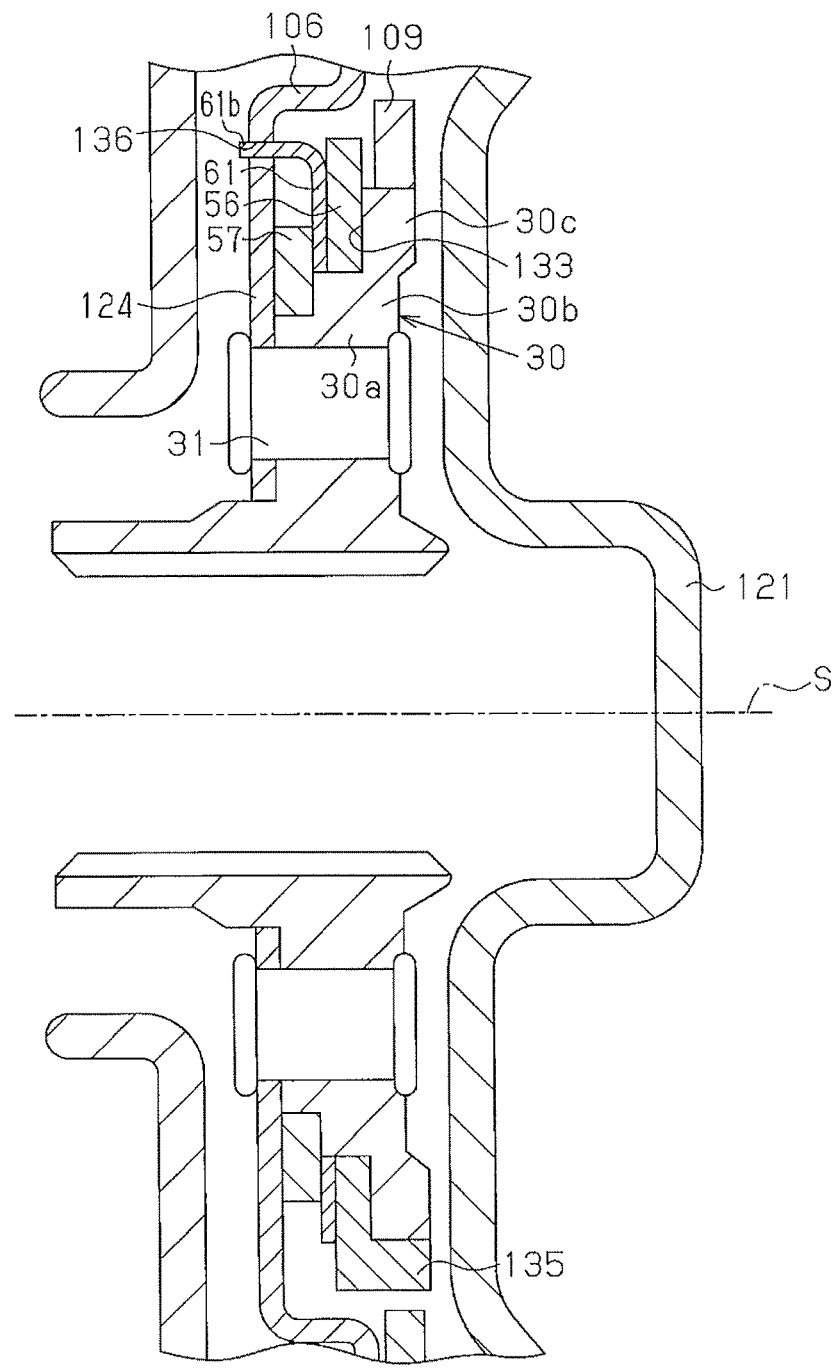
FIG. 9 is a partially enlarged view showing a center shaft part of the damper device.

As shown in FIG. 9, which is a partially enlarged view of a central shaft portion, the inner portion 124 of the first plate 106 is fixed to the hub flange 30 of the hub 28 by rivets 31. The hub flange 30 includes a first disc portion 30a, a second disc portion 30b, and a third disc portion 30c, which lie along concentric circles and have different outer diameters. The intermediate member 109 is rotatably supported by the outer circumference of the third disc portion 30c. A hysteresis disc spring 57 serving as the second biasing member is fitted and attached to the smallest first disc portion 30a. A hysteresis washer 61 and a second friction member 56 are fitted and attached to the second disc portion 30b.

The hysteresis washer 61 and the second friction member 56 are arranged between the surface 133 of the third disc portion 30c, which has the largest outer diameter, and the hysteresis disc spring 57, which is received by the inner portion 124 of the first plate 106. Therefore, the biasing force of the hysteresis disc spring 57 acts on the hysteresis washer 61 and the second friction member 56, and frictional force for suppressing rotation of the second friction member 56 relative to the hysteresis washer 61 is generated. An engagement piece 61b, which is bent to be L-shaped, is formed at the outer circumference of the hysteresis washer 61. The engagement piece 61b is fitted to an engagement hole 136 formed in the inner portion 124.

Engagement pieces 135 that are bent to be L-shaped are arranged at the outer circumference of the second friction member 56. The engagement pieces 135 engage with engagement grooves 137 formed in the intermediate member 109. Therefore, although the intermediate member 109 is rotated when the damper springs 42 are compressed, the engagement pieces 135 restrict the rotation. The engagement grooves 137 formed in the intermediate member 109, which are longer than the engagement pieces 135, are rotated by a predetermined angle without any restrictions from the engagement pieces 135 but come into contact with the engagement pieces 135 when rotated by a certain angle. In other words, the engagement pieces 135 engage the engagement grooves 137 with a margin of a predetermined rotation angle.

When the compression of the damper spring 42 rotates the intermediate member 109 by a predetermined angle and the distal end of the engagement groove 137 comes into contact with the engagement piece 135 of the second friction member 56, the second friction member 56 rotates with the intermediate member 109. However, the biasing force of the hysteresis disc spring 57 is applied to the second friction member 56. This produces a predetermined slip frictional force during the rotation. Accordingly, a large impact torque is alleviated and absorbed by the slip friction of the second friction member 56 when the damper springs 42 are compressed. This allows for the employment of a spring having a relatively low spring constant as the damper spring 42.

A drive plate 117 is fastened by screws to the front cover 21 by way of a coupling member 125, which is welded to the peripheral portion of the front cover 21. The drive plate 117 is coupled to the crankshaft 12a. A center portion 121 fitted to a center hole 126 of a crankshaft 12a is formed in the center of the front cover 21. Therefore, the torque of the crankshaft 12a is transmitted to the outer case 23 through the drive plate 117 to rotate the damper device 101. Spline teeth are formed in the outer circumference of the limiter plate 102. The spline teeth are mated with spline grooves formed in the inner circumferential surface of the outer case 23.

The limiter plate 102 is rotated with the outer case 23 and pushed by the limiter disc spring 103. This rotates the central disc 108, which is arranged between the limiter plate 102 and the front cover 21. In other words, the first friction members 52 are formed on the two surfaces of the central disc 108. This rotates the limiter plate 102 without any slipping. Then, the rotational torque of the central disc 108 is transmitted to the first plate 106 by the damper springs 42. This rotates the input shaft 16 serving as an output member fitted to the shaft hole 112 of the hub 28.

Normal impact torque is absorbed by the compressing deformation of the damper spring 42. When the compressed amount of the damper springs 42 becomes large, the second friction member 56 restricts rotation of the intermediate member 109 resulting from the compression of the damper springs 42. In other words, the impact torque is partially absorbed by the friction rotation of the second friction member 56. If a larger impact torque is generated, the impact torque is alleviated by an auxiliary damper spring 138 arranged in the damper device 101.

Figure 10:
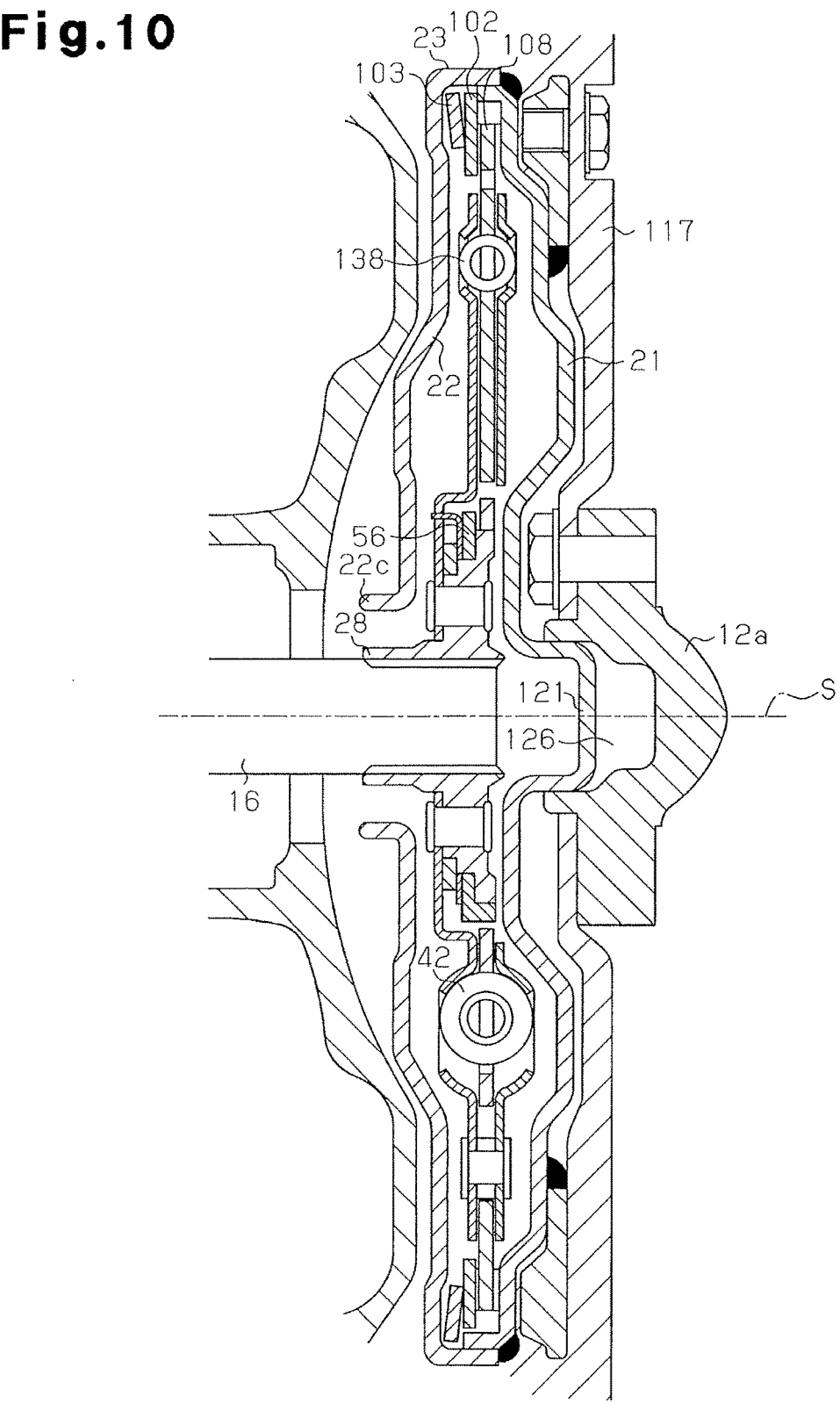
FIG. 10 is a cross-sectional view showing a power transmission mechanism secured to the damper of FIG. 7.

FIG. 10 shows a state in which the damper of the second embodiment is attached to a power transmission mechanism. The crankshaft 12a is coupled to the drive plate 117. Therefore, the drive plate 117 and the outer case 23 are rotated by the crankshaft 12a, and the rotational torque is transmitted from the central disc 108 to the first plate 106. This rotates and drives the input shaft 16 fitted to the shaft hole 112 of the hub 28.

If a large torque acts on the central disc 108 of the damper device 101, the central disc 108 slips and idly rotates. In the present invention, the outer case 23 is filled with lubricant oil, and the critical torque at which the central disc 108 spins is substantially constant. In other words, the lubricant oil prevents the engagement surface of the friction member from rusting. This keeps the friction coefficient constant.

In the damper 114, the outer case 23 is filled with the lubricant oil. Therefore, the central disc 108, the first plate 106, the second plate 107, the intermediate member 109, the damper spring 42, the limiter plate 102, the second friction member 56, and the like of the damper device 101 arranged in the outer case 23 may be lubricated. In particular, the first friction member 52 at the peripheral portion of the central disc 108 does not rust.

Figure 11A:
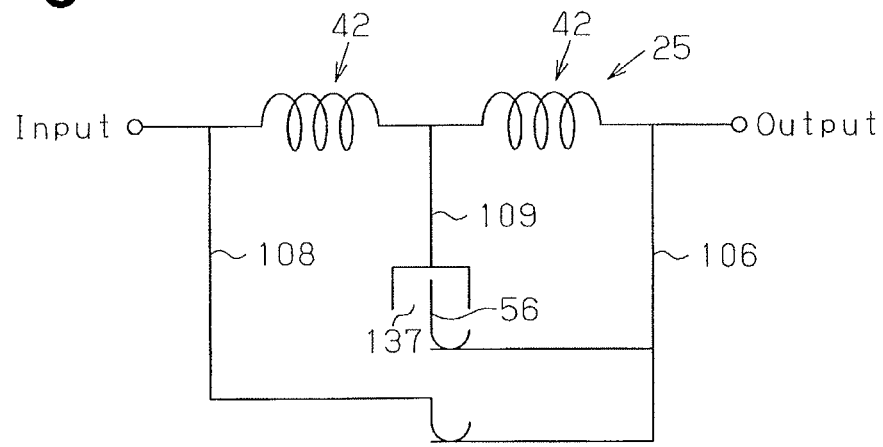
FIGS. 11A to 11C are schematic diagrams respectively showing specific examples of a damper.
Figure 11B:
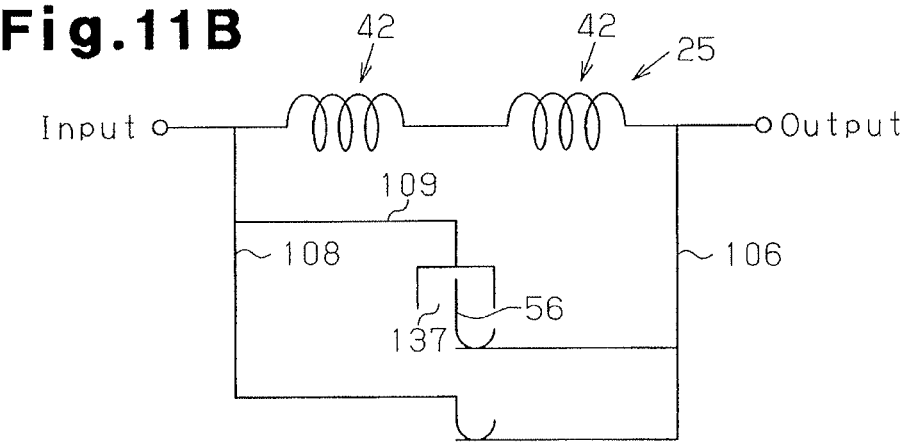
Figure 11C:
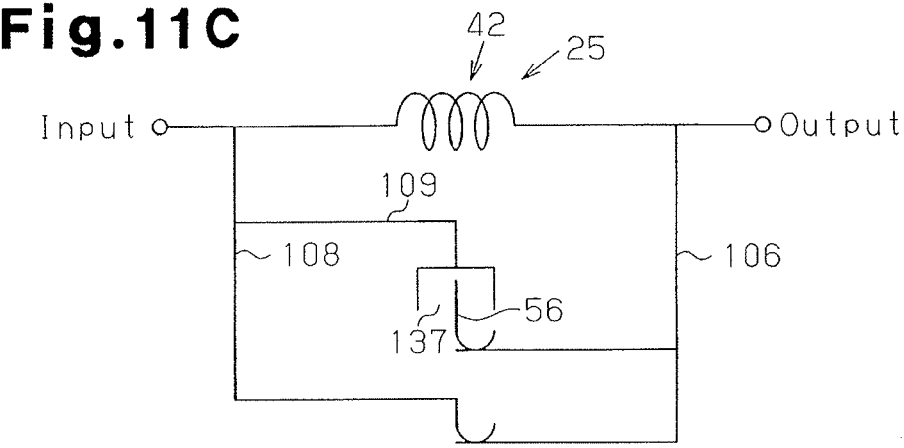

FIGS. 11A to 11C are schematic diagrams of the damper device 101. FIG. 11A shows the damper device 101 shown in FIGS. 7 and 8. Reference numeral 42 denotes a damper spring, reference numeral 108 denotes a central disc, reference numeral 109 denotes an intermediate member, reference numeral 106 denotes a first plate, reference numeral 56 denotes a second friction member, and reference numeral 137 denotes an engagement groove.

When the central disc 108, which serves as the torque input side portion, moves relative to the first plate 106, which serves as the torque output side portion, that is, when the central disc 108 moves toward the right and approaches the first plate 106 and the distance between the central disc 108 and first plate 106 decreases, the two damper springs 42 that are in series are compressed. Further, a small slip friction is generated between the central disc 108 and the first plate 106. However, the slip friction is small and such that it does not influence the damper effect of the damper device 101.

In the damper of FIG. 7, the small slip friction is obtained by a structure in which the central disc 108 is arranged between the inner sides of the first plate 106 and the second plate 107. The intermediate member 109 moves toward the when the damper springs 42 are compressed. When the movement distance of the intermediate member 109 reaches a predetermined length, the second friction member 56 moves and generates slip friction with the first plate 106, which serves as the torque output side portion. The slip friction reaches a level of a certain extent, and the energy of the impact torque may be absorbed as the damper springs 42 are compressed. The movement distance of the intermediate member 109 when the second friction member 56 starts to slide is determined by the length of the engagement groove 137 formed in the intermediate member 109.

FIG. 11B shows a state in which the engagement groove 137 is formed in the central disc 108, and the second friction member 56 is fitted to the engagement groove 137. When the central disc 108, which serves as the torque input side portion, moves toward the right and approaches the first plate 106 and the distance decreases between the central disc 108 and the first plate, the two damper springs 42 that are arranged in series are compressed. A small slip friction is generates between the central disc 108 and the first plate 106. However, the slip friction is small and such that it does not influence the damper effect of the damper device 101.

The central disc 108 includes the engagement groove 137, and the second friction member 56 engages the engagement groove 137. The damper device 101 is configured such that when the movement distance reaches a predetermined length, the second friction member 56 moves and generates the slip friction with the first plate 106, which becomes the torque output side portion.

FIG. 11C shows a structure in which a single damper spring 42 is arranged between the spring holders 122 of the central disc 108. The other parts are the same as the structure of FIG. 11B. In other words, by attaching the second friction member 56, the damper of the second embodiment absorbs the energy of the impact torque through the slipping of the second friction member 56. Thus, the damper springs 42 do not have to be arranged in series.

Figure 12:
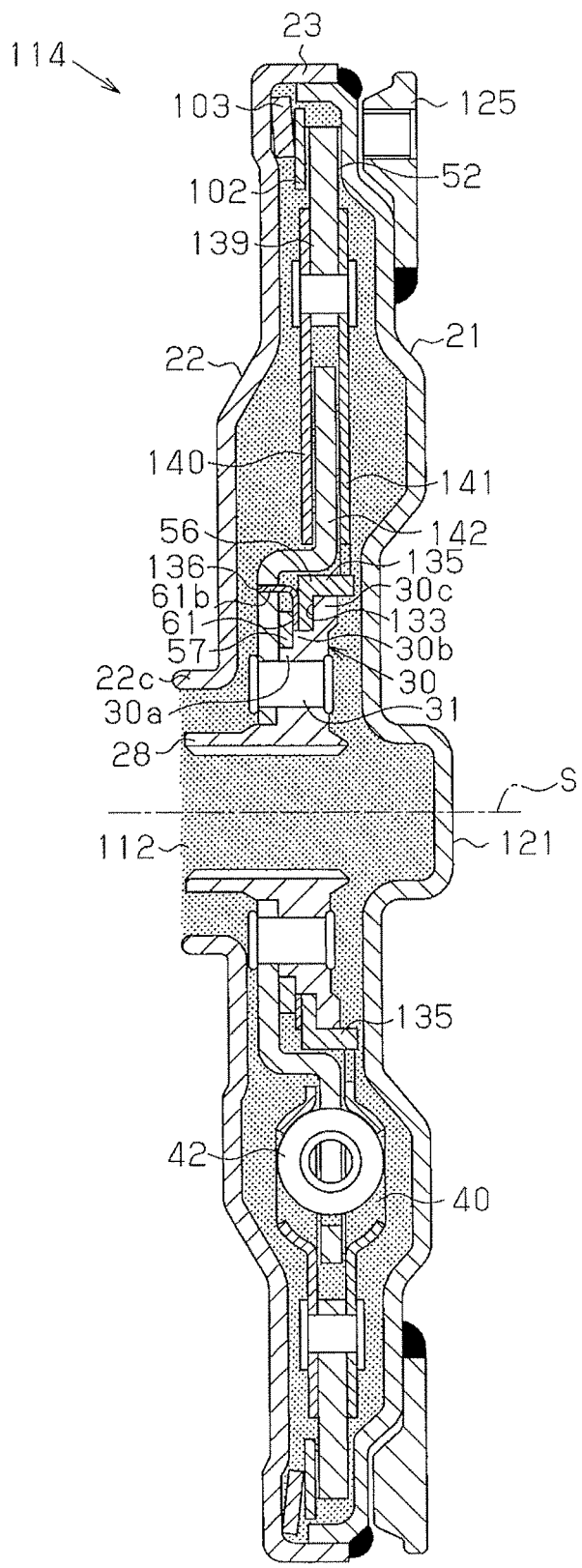
FIG. 12 is a cross-sectional view showing a damper according to a third embodiment of the present invention.
Figure 13:
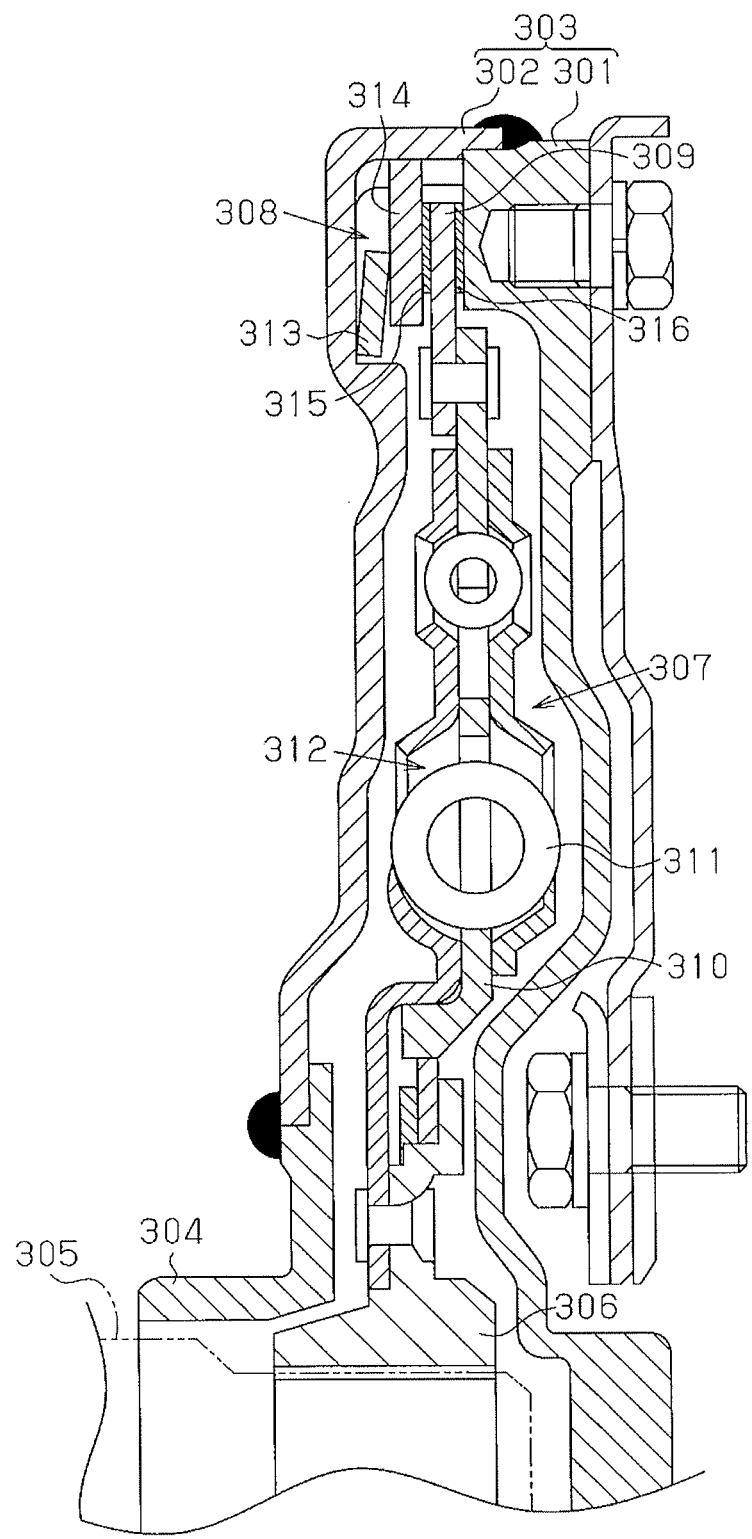
FIG. 13 is a cross-sectional view showing a conventional damper.

FIG. 12 is a cross-sectional view showing a third embodiment of a damper according to the present invention. In FIG. 12, reference numeral 139 denotes a central disc, reference numeral 140 denotes a first plate, reference numeral 141 denotes a second plate, and reference numeral 142 denotes an output side disc serving as a torque output side portion.

The central disc 139 is arranged between and fixed by the first plate 140 and the second plate 141. The central disc 139, the first plate 140, and the second plate 141 form a torque input side portion. The output side disc 142, which serves as the torque output side portion, is arranged on the inner circumferential side of the substantially ring-shaped central disc 139. The output side disc 142 is arranged between the first plate 140 and the second plate 141.

A damper spring 42 is accommodated in a spring accommodation hole 40 formed by the first plate 140 and the second plate 141. The output side disk 142 has an inner circumference portion that is located radially inward from the spring accommodation hole 40 and an outer circumference portion that is located radially outward from the spring accommodation hole 40. Although the detail is not shown in FIG. 12, the first plate 140 and the second plate 141 are formed in such a manner that the first plate 140 and the second plate 141 are contactable in a slipping manner with the inner circumference portion of the output side disc 142. The damper spring 42 is elastically deformed when the first plate 140 and second plate 141 and the output side disc 142 are torsion rotated relative to each other. A first friction member 52 is arranged on each of the two opposite surfaces at the peripheral portion of the central disc 139. A ring-shaped limiter plate 102 is arranged on one side of the peripheral portion of the central disc 139. Biasing force is applied to the limiter plate 102 by a limiter disc spring 103 serving as a first biasing member arranged between the limiter plate 102 and the outer case 23.

Accordingly, compression of the damper springs 42 alleviates impact torque within a certain range. However, if a large torque that exceeds a limit is generated, the central disc 139 slips and relives the impact torque. This aspect is the same as the damper of the second embodiment shown in FIG. 7. However, the damper shown in FIG. 12 has a structure in which the first plate 140 and the second plate 141 holding the central disc 139 in between form the torque input side portion, and the output side disc 142 is discretely provided.

The inner portion of the output side disc 142 is curved and fixed to a hub flange 30 of a hub 28 by rivets 31. The hub flange 30 includes a first disc portion 30a, a second disc portion 30b, and a third disc portion 30c, which are concentric to each other and have different outer diameters. A hysteresis disc spring 57 serving as the second biasing member is fitted and attached to the smallest first disc portion 30a, and a hysteresis washer 61 and the second friction member 56 are fitted and attached to the second disc portion 30b.

The hysteresis washer 61 and the second friction member 56 are arranged between the third disc portion 30c, which has the largest outer diameter, and the hysteresis disc spring 57, which is received by the inner portion of the output side disc 142. Therefore, the biasing force of the hysteresis disc spring 57 acts on the hysteresis washer 61 and the second friction member 56. This generates frictional force suppressing the relative torsion rotation of the second friction member 56 and the hysteresis washer 61. An engagement piece 61b bent to be L-shaped is arranged on the outer circumference of the hysteresis washer 61. The engagement piece 61b is fitted to the engagement hole 136 formed in the inner portion of the output side disc 142.

An engagement piece 135 bent to be L-shaped is also arranged on the outer circumference of the second friction member 56. The engagement piece 135 is engaged with an engagement groove formed in the inner circumference of the second plate 141. Therefore, when the compression of the damper spring 42 generates relative torsion rotation between the output side disc 142 and the second plate 141, the rotation is restricted by the engagement piece 135 of the second friction member 56. The engagement groove in the second plate 141 is longer than the engagement piece 135, rotated by a predetermined torsion angle without any restrictions, and come into contact with the engagement piece 135 when rotated by a certain constant angle. In other words, the engagement piece 135 engages the engagement groove with a margin of a predetermined rotation angle.

When the compression of the damper spring 42 rotates the output side disc 142 by a predetermined angle, the distal end of the engagement groove comes into contact with the engagement piece 135 of the second friction member 56, and the second friction member 56 rotates with the second plate 141. However, the biasing force of the hysteresis disc spring 57 is applied to the second friction member 56. This generates a predetermined slip frictional force during rotation. Therefore, a large impact torque is alleviated and absorbed by the slip friction of the second friction member 56 when the damper spring 42 is compressed.

What is claimed is:

1. A damper incorporated in a power transmission mechanism for a hybrid vehicle, the damper comprising:
   a housing including a first cover and a second cover joined with each other, in which the housing is coupled to a drive plate and filled with lubricant oil; and
   a damper device arranged in the housing, the damper device including:
   a central disc;
   a first friction member arranged at a peripheral portion of the central disc;
   a limiter plate arranged to face toward the first friction member;
   a first biasing member which pushes the limiter plate so that the central disc is arranged between the limiter plate and the housing;
   a hub having a shaft hole arranged at a center of the damper device and fitted to an output member;
   a first plate and a second plate arranged at opposite sides of the central disc and are immovably fixed to the central disc, such that the first plate, the second plate and the central disc form a torque input side portion;
   an output side disc, which is a torque output side portion, fixed to the hub and arranged between the first plate and the second plate;
   a plurality of damper springs accommodated in a spring accommodation hole formed between the first plate and the second plate, in which the damper springs elastically couple the torque input side portion and the output side disc;
   a second friction member arranged between the output side disc and the torque input side portion; and
   a second biasing member which biases the second friction member, wherein the second friction member suppresses relative rotation of the torque input side portion and the output side disc that is greater than or equal to a certain level with slip friction generated when the damper springs deform.

2. The damper according to claim 1, wherein the first plate and the second plate are contactable in a slipping manner with an inner circumference portion of the output side disc.

3. The damper according to claim 1, wherein the second friction member engages an engagement groove formed in at least one of the first plate and the second plate so as to be rotatable in a predetermined rotation angle range relative to at least one of the first plate and the second plate, and the second friction member generates a slip friction when a relative rotation angle between the torque input side portion and the output side disc becomes greater than or equal to a certain angle.

4. The damper according to claim 1, wherein:
the hub includes a flange having first to third disc portions that are concentric and have different outer diameters, in which the second biasing member is attached to the first disc portion having the smallest diameter, a washer and the second friction member are attached to the second disc portion having an intermediate outer diameter, and the washer and the second friction member are arranged between the output side disc and the third disc portion in a state in which a biasing force of the second biasing member is applied; and
an engagement piece arranged in the washer engages with an engagement hole of the output side disc.

5. A damper incorporated in a power transmission mechanism for a hybrid vehicle, the damper comprising:
a housing including a first cover and a second cover joined with each other to define a space filled with lubricant oil, wherein the housing is coupled to a drive plate; and
a damper device arranged in the housing, the damper device including:
a central disc;
a first friction member arranged at a peripheral portion of the central disc;
a limiter plate arranged to face toward the first friction member;
a first biasing member which pushes the limiter plate so that the central disc is arranged between the limiter plate and the housing;
a hub having a shaft hole arranged at a center of the damper device and fitted to an output member;
a first plate and a second plate, each having an outer portion, arranged on opposite sides of the central disc and wherein the central disc is immovably fixed to said outer portions, and wherein the first plate, the second plate and the central disc form a torque input side portion;
an output side disc, which is a torque output side portion, fixed to the hub and arranged between the first plate and the second plate;
a plurality of damper springs accommodated in a spring accommodation hole formed between the first plate and the second plate, in which the damper springs elastically couple the torque input side portion and the output side disc;
a second friction member arranged between the output side disc and the torque input side portion; and
a second biasing member which biases the second friction member, wherein the second friction member suppresses relative rotation of the torque input side portion and the output side disc that is greater than or equal to a certain level with slip friction generated when the damper springs deform.

6. The damper according to claim 5, wherein the first plate and the second plate are contactable in a slipping manner with an inner circumference portion of the output side disc.

7. The damper according to claim 5, wherein the second friction member engages an engagement groove formed in at least one of the first plate and the second plate so as to be rotatable in a predetermined rotation angle range relative to at least one of the first plate and the second plate, and the second friction member generates a slip friction when a relative rotation angle between the torque input side portion and the output side disc becomes greater than or equal to a certain angle.

8. The damper according to claim 5, wherein:
the hub includes a flange having first to third disc portions that are concentric and have different outer diameters, in which the second biasing member is attached to the first disc portion having the smallest diameter, a washer and the second friction member are attached to the second disc portion having an intermediate outer diameter, and the washer and the second friction member are arranged between the output side disc and the third disc portion in a state in which a biasing force of the second biasing member is applied; and
an engagement piece arranged in the washer engages with an engagement hole of the output side disc.

* * * * *